United States Patent
Kaminsky et al.

(10) Patent No.: US 10,408,534 B2
(45) Date of Patent: Sep. 10, 2019

(54) SYSTEMS AND METHODS FOR USING COLD LIQUID TO REMOVE SOLIDIFIABLE GAS COMPONENTS FROM PROCESS GAS STREAMS

(75) Inventors: Robert D. Kaminsky, Houston, TX (US); Moses Minta, Missouri City, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 1125 days.

(21) Appl. No.: 13/575,907

(22) PCT Filed: Jan. 5, 2011

(86) PCT No.: PCT/US2011/020247
§ 371 (c)(1),
(2), (4) Date: Oct. 8, 2012

(87) PCT Pub. No.: WO2011/097043
PCT Pub. Date: Aug. 11, 2011

(65) Prior Publication Data
US 2013/0074541 A1   Mar. 28, 2013

(51) Int. Cl.
*F25J 1/00* (2006.01)
*B01D 7/02* (2006.01)
*B01D 53/00* (2006.01)

(52) U.S. Cl.
CPC ............... *F25J 1/00* (2013.01); *B01D 7/02* (2013.01); *B01D 53/002* (2013.01);
(Continued)

(58) Field of Classification Search
CPC ............. B01D 7/02; B01D 53/002; B01D 2257/302–2257/304; B01D 2257/502;
(Continued)

(56) References Cited

U.S. PATENT DOCUMENTS 2,621,216 A    12/1952  White ................ 260/683.3
2,863,527 A    12/1958  Herbert et al. ........... 183/115
(Continued)

FOREIGN PATENT DOCUMENTS

EP    0508244    10/1992  ............. B01D 53/34
EP    1323698     7/2003  ............. C07C 29/38
(Continued)

OTHER PUBLICATIONS

Aaron, D. et al. (2005) "Separation of $CO_2$ from Flue Gas: A Review," *Separation and Technology*, 40, pp. 321-348.
(Continued)

*Primary Examiner* — Keith Raymond
*Assistant Examiner* — Webeshet Mengesha
(74) *Attorney, Agent, or Firm* — ExxonMobil Upstream Research Company—Law Department

(57) ABSTRACT

Systems and methods are described for re-moving solidifiable gas from a process gas stream by direct contact with a cold liquid. The process gas stream includes at least gas that is frozen by the cold liquid while one or more other gases of the process gas stream remain in a gaseous state. The process gas stream may include water, and will have a different composition than the cold liquid. The contacting of the cold liquid with the process gas stream may be at a pressure that is less than 200 psia, and optionally less than 100 psia, 50 psia, or even 30 psia, and the solidified gas may be removed from the contacting assembly as a slurry with cold liquid.

32 Claims, 6 Drawing Sheets

(52) U.S. Cl.
CPC .. *B01D 2257/302* (2013.01); *B01D 2257/304* (2013.01); *B01D 2257/308* (2013.01); *B01D 2257/504* (2013.01); *B01D 2258/0283* (2013.01); *Y02P 70/34* (2015.11)

(58) Field of Classification Search
CPC ............ B01D 2257/104; F25J 2205/20; F25J 2205/32; F25J 3/066; F25J 3/209; F25J 3/0233; F25J 2280/40; F25J 2220/66; C10L 3/104
USPC .......... 62/601, 602, 532, 533, 632–633, 637
See application file for complete search history.

(56) References Cited

U.S. PATENT DOCUMENTS

| | | | |
|---|---|---|---|
| 3,050,950 A | 8/1962 | Karwat et al. | 62/13 |
| 3,109,726 A | 11/1963 | Karwat | 62/13 |
| 3,393,527 A | 7/1968 | Swensen et al. | 62/16 |
| 3,400,512 A * | 9/1968 | McKay | 95/197 |
| 3,767,766 A | 10/1973 | Tjoa | 423/220 |
| 3,933,001 A | 1/1976 | Muska | 62/47 |
| 4,246,015 A | 1/1981 | Styring | 62/12 |
| 4,405,585 A | 9/1983 | Sartori et al. | 423/228 |
| 4,417,449 A | 11/1983 | Hegarty et al. | 62/28 |
| 4,421,535 A | 12/1983 | Mehra | 62/17 |
| 4,459,142 A | 7/1984 | Goddin | 62/17 |
| 4,511,382 A | 4/1985 | Valencia et al. | 62/20 |
| 4,512,782 A | 4/1985 | Bauer et al. | 55/48 |
| 4,533,372 A | 8/1985 | Valencia et al. | 62/12 |
| 4,551,158 A | 11/1985 | Wagner et al. | 55/46 |
| 4,563,202 A | 1/1986 | Yao et al. | 62/17 |
| 4,602,477 A | 7/1986 | Lucadamo | 62/24 |
| 4,609,388 A | 9/1986 | Adler et al. | 62/12 |
| 4,695,672 A | 9/1987 | Bunting | 585/867 |
| 4,720,294 A | 1/1988 | Lucadamo et al. | 62/31 |
| 4,762,543 A | 8/1988 | Pantermuehl et al. | 62/28 |
| 4,769,054 A * | 9/1988 | Steigman | 62/601 |
| 4,831,206 A | 5/1989 | Zarchy | 585/737 |
| 4,923,493 A | 5/1990 | Valencia et al. | 62/13 |
| 4,935,043 A | 6/1990 | Blanc et al. | 62/20 |
| 4,976,849 A | 12/1990 | Soldati | 208/351 |
| 5,062,270 A | 11/1991 | Haut et al. | 62/12 |
| 5,120,338 A | 6/1992 | Potts et al. | 62/12 |
| 5,233,837 A | 8/1993 | Callahan | 62/38 |
| 5,265,428 A | 11/1993 | Valencia et al. | 62/36 |
| 5,335,504 A | 8/1994 | Durr et al. | 62/20 |
| 5,620,144 A | 4/1997 | Strock et al. | 239/557 |
| 5,700,311 A | 12/1997 | Spencer | 95/236 |
| 5,720,929 A | 2/1998 | Minkkinen et al. | 422/190 |
| 5,819,555 A | 10/1998 | Engdahl | 62/637 |
| 5,956,971 A | 9/1999 | Cole et al. | 62/623 |
| 5,964,985 A | 10/1999 | Wootten | 201/40 |
| 5,983,663 A | 11/1999 | Sterner | 62/620 |
| 6,053,007 A | 4/2000 | Victory et al. | 62/619 |
| 6,082,133 A | 7/2000 | Barclay et al. | 62/619 |
| 6,082,373 A | 7/2000 | Sakurai et al. | 134/1 |
| 6,162,262 A | 12/2000 | Minkkinen et al. | 23/295 |
| 6,223,557 B1 | 5/2001 | Cole | 62/613 |
| 6,240,744 B1 | 6/2001 | Agrawal et al. | 62/643 |
| 6,336,334 B1 | 1/2002 | Minkkinen et al. | 62/123 |
| 6,374,634 B2 | 4/2002 | Gallarda et al. | 62/620 |
| 6,401,486 B1 | 6/2002 | Lee et al. | 62/630 |
| 6,416,729 B1 | 7/2002 | DeBerry et al. | 423/573.1 |
| 6,442,969 B1 | 9/2002 | Rojey et al. | 62/618 |
| 6,505,683 B2 | 1/2003 | Minkkinen et al. | 166/266 |
| 6,517,801 B2 | 2/2003 | Watson et al. | 423/574.1 |
| 6,539,747 B2 | 4/2003 | Minta et al. | 62/620 |
| 6,565,629 B1 | 5/2003 | Hayashida et al. | 95/211 |
| 6,735,979 B2 | 5/2004 | Lecomte et al. | 62/611 |
| 6,818,194 B2 | 11/2004 | DeBerry et al. | 423/228 |
| 6,946,017 B2 | 9/2005 | Leppin et al. | 95/139 |
| 6,958,111 B2 | 10/2005 | Rust et al. | 202/158 |
| 6,962,061 B2 | 11/2005 | Wilding et al. | 62/613 |
| 7,001,490 B2 | 2/2006 | Wostbrock et al. | 203/1 |
| 7,004,985 B2 | 2/2006 | Wallace et al. | 48/198.3 |
| 7,073,348 B2 | 7/2006 | Clodic et al. | 62/532 |
| 7,121,115 B2 | 10/2006 | Lemaire et al. | 62/625 |
| 7,152,431 B2 | 12/2006 | Amin et al. | 62/637 |
| 7,211,701 B2 | 5/2007 | Muller et al. | 568/853 |
| 7,219,512 B1 | 5/2007 | Wilding et al. | 62/617 |
| 7,325,415 B2 | 2/2008 | Amin et al. | 62/541 |
| 7,424,808 B2 | 9/2008 | Mak | 62/625 |
| 7,442,233 B2 | 10/2008 | Mitariten | 95/123 |
| 7,493,779 B2 | 2/2009 | Amin | 62/617 |
| 7,550,064 B2 | 6/2009 | Bassler et al. | 203/29 |
| 7,691,239 B2 | 4/2010 | Kister et al. | 203/2 |
| 7,722,289 B2 | 5/2010 | Leone et al. | 405/53 |
| 8,308,849 B2 | 11/2012 | Gal | 95/187 |
| 2002/0174687 A1 | 11/2002 | Cai | 65/158 |
| 2003/0181772 A1 | 9/2003 | Meyer et al. | 585/324 |
| 2003/0192343 A1 | 10/2003 | Wilding et al. | 62/613 |
| 2006/0144079 A1 | 7/2006 | Amin | 62/532 |
| 2006/0179878 A1 | 8/2006 | Nohlen | 62/617 |
| 2006/0239879 A1 | 10/2006 | Lallemand et al. | 423/210 |
| 2007/0056317 A1 | 3/2007 | Amin et al. | 62/532 |
| 2007/0144943 A1 | 6/2007 | Lemaire et al. | 208/208 |
| 2007/0277674 A1 | 12/2007 | Hirano et al. | 95/290 |
| 2008/0034789 A1 | 2/2008 | Fieler et al. | 62/623 |
| 2008/0282884 A1 | 11/2008 | Kelley et al. | 95/96 |
| 2008/0307827 A1 | 12/2008 | Hino et al. | 62/634 |
| 2009/0023605 A1 | 1/2009 | Lebl et al. | 506/27 |
| 2009/0071648 A1 | 3/2009 | Hagen et al. | 166/272.1 |
| 2009/0220406 A1 | 9/2009 | Rahman | 423/437.1 |
| 2009/0261017 A1 | 10/2009 | Iqbal et al. | 208/128 |
| 2010/0018248 A1* | 1/2010 | Fieler | F25J 3/0209 62/617 |
| 2010/0024472 A1 | 2/2010 | Amin et al. | 62/541 |
| 2010/0064889 A1* | 3/2010 | Gal | 95/183 |
| 2010/0107687 A1 | 5/2010 | Andrian et al. | 62/620 |
| 2011/0252827 A1* | 10/2011 | Lockwood et al. | 62/602 |

FOREIGN PATENT DOCUMENTS

| | | | | |
|---|---|---|---|---|
| GB | 2221977 | 2/1990 | | F25J 3/02 |
| WO | WO2001/085656 | 11/2001 | | C07C 11/167 |
| WO | WO2002/039038 | 5/2002 | | F25J 3/06 |
| WO | WO2003/062725 | 7/2003 | | F25J 3/08 |
| WO | WO2004/009204 | 1/2004 | | B01D 3/32 |
| WO | WO2004/020118 | 3/2004 | | B08B 9/00 |
| WO | WO2004/047956 | 6/2004 | | B01D 53/14 |
| WO | WO2004/070297 | 8/2004 | | F25J 3/06 |
| WO | WO2006/022885 | 3/2006 | | B01D 53/14 |
| WO | WO2007/030888 | 3/2007 | | F25J 3/08 |
| WO | WO2008/091316 | 7/2008 | | F25J 3/00 |
| WO | WO2008/091317 | 7/2008 | | F25D 25/00 |
| WO | WO2008/095258 | 8/2008 | | F25J 3/02 |
| WO | WO2008/152030 | 12/2008 | | B01D 53/00 |
| WO | WO2009/087206 | 7/2009 | | B01D 53/00 |
| WO | WO2010/003894 | 1/2010 | | F25J 3/06 |
| WO | WO2010/006934 | 1/2010 | | F25J 3/02 |
| WO | WO2010/023238 | 3/2010 | | F25J 3/06 |
| WO | WO2010/034627 | 4/2010 | | F25J 3/06 |
| WO | WO2010/052299 | 5/2010 | | B01D 53/00 |
| WO | WO2010/079175 | 7/2010 | | F25J 3/06 |
| WO | WO2010/079177 | 7/2010 | | F25J 3/06 |
| WO | WO2011/140117 | 11/2011 | | B01D 53/00 |

OTHER PUBLICATIONS

Amin, R. (2003) "Advanced Mini Natural Gas Liquefier," *LNG Journal*, Mar.-Apr. 2003, pp. 20-23.

Denton, R. D. et al. (1985) "Integrated Low Temperature Processing of Sour Natural Gas," *Gas Processors Assoc.*, 64th Ann. Conv., pp. 92-96.

Hassan, S. M. N. (2005) "Techno-Economic Study of $CO_2$ Capture Process for Cement Plants," *University of Waterloo—Thesis*, 200 pages.

Haut, R. C. et al. (1988) "Development and Application of the Controlled Freeze Zone Process," *SPE* 17757, SPE Gas Tech. Symp.—Dallas, TX, pp. 435-443.

(56) References Cited

OTHER PUBLICATIONS

Haut, R. C. et al. (1988) "Development and Application of the Controlled Freeze Zone Process," *OSEA 88197, 7th Offshore So. East Asia Conf.*, Singapore, Feb. 1988, pp. 840-848.
Haut, R. C. et al. (1989) "Development and Application of the Controlled Freeze Zone Process," *SPE Production Engineering*, Aug. 1989, pp. 265-271.
Mitariten, M. et al. (2007) "The Sorbead™ Quick-Cycle Process for Simultaneous Removal of Water, Heavy Hydrocarbons and Mercaptans from Natural Gas," *Laurance Reid Gas Conditioning Conference*, Feb. 25-27, 2007, 14 pages.
Northrop, P. Scott et al. (2004) "Cryogenic Sour Gas Process Attractive for Acid Gas Injection Applications," *83rd Ann. Gas Processors Assoc. Convention*, New Orleans, LA, 8 pgs.
Pagcatipunan, C. et al. (2005) "Maximize the Performance of Spray Nozzle Systems," *CEP Magazine*, Dec. 2005, pp. 38-44.
Reyes, S. C. et al. (1997) "Frequency Modulation Methods for Diffusion and Adsorption Measurements in Porous Solids," *J. Phys. Chem. B*, v.101, pp. 614-622.
Thomas, E. R. et al. (1987) "Conceptual Studies Using the Controlled Freeze Zone (CFZ) Process," *AIChE Summer Nat'l Mtg.*, Aug. 16-19, 1987, 16 pages.
Thomas, E. R. et al. (1988) "Conceptual Studies for $CO_2$/Natural Gas Separation Using the Control Freeze Zone (CFZ) Process," *Gas Separation and Purification*, v. 2, pp. 84-89.
Victory, D. J. et al. (1987) "The CFZ Process: Direct Methane-Carbon Dioxide Fractionation," *66th Ann. GPA Convention*, Mar. 16-18, Denver, CO, 4 pages.

* cited by examiner

SYSTEMS AND METHODS FOR USING COLD LIQUID TO REMOVE SOLIDIFIABLE GAS COMPONENTS FROM PROCESS GAS STREAMS

CROSS-REFERENCE TO RELATED APPLICATION

This application is the National Stage of International Application No. PCT/US2011/020247 filed Jan. 8, 2011, which claims the priority benefit of U.S. Provisional Patent Application 61/300,952 filed 3 Feb. 2010 entitled SYSTEMS AND METHODS FOR USING COLD LIQUID TO REMOVE SOLIDIFIABLE GAS COMPONENTS FROM PROCESS GAS STREAMS, and U.S. Provisional Patent Application 61/425,558 filed 21 Dec. 2010 entitled SYSTEMS AND METHODS FOR USING COLD LIQUID TO REMOVE SOLIDIFIABLE GAS COMPONENTS FROM PROCESS GAS STREAMS the entirety of which are incorporated by reference herein.

FIELD OF THE DISCLOSURE

Provided are systems and methods for treating gas streams to remove selected gas components therefrom by freezing of the selected components, and more particularly to systems and methods for removing solidifiable gases, such as greenhouse gases, by directly contacting the gas stream with a cold liquid.

BACKGROUND OF THE DISCLOSURE

Industrial processes, including industrial combustion processes, create a variety of gas streams, many of which are ultimately exhausted to the environment. These gas streams may include greenhouse gases or other gaseous components that may be desirable to be removed from the process gas stream, such as prior to exhausting these streams to the environment. An illustrative, non-exclusive example of such a greenhouse gas is carbon dioxide, and an illustrative, non-exclusive example of such a gas stream is a flue gas stream from a burner or other combustion unit. Flue and other gas streams containing carbon dioxide may be generated by a variety of industrial processes, such as power generation, heating, and steam generation. Many such processes are performed at atmospheric, or near-atmospheric, pressure and are air-fired, thereby resulting in flue gas streams that are at, or near, atmospheric pressure and which are highly diluted with nitrogen gas from the air stream used to support combustion.

Conventionally, carbon dioxide may be removed from flue gas streams by a variety of processes, such as processes that involve amine or ammonia treating of the flue gas stream, adsorbing the carbon dioxide with a solid adsorbent, and removing the carbon dioxide using physical solvents. Illustrative examples of such conventional processes are disclosed in D. Aaron and C. Tsouris, "Separation of $CO_2$ from Flue Gas: A Review," *Separation Science and Technology*, 40, 321-48, 2005. Another example of a process for removing carbon dioxide from natural gas utilizes Joule-Thompson expansion of a gas stream to cool the gas stream using a refluxing distillation tower. This process may be referred to as a "Control Freeze Zone" process and is disclosed in U.S. Pat. Nos. 4,533,372, 5,062,270, 5,120,338, 5,956,971, and 6,053,007, the disclosures of which are incorporated by reference. Yet another process is disclosed in U.S. Pat. No. 7,073,348, which discloses passing carbon-dioxide containing gas streams over surfaces that are cycled between freezing and melting temperatures, and the disclosure of which is incorporated by reference.

These processes, while effective, typically have high energy or solvent requirements, or demands, and may require high pressures to operate effectively. For example, for coal-fired power plants, removal of carbon dioxide from flue gases using an amine-treating process is estimated to reduce the net power generation by approximately 30%. Some such conventional processes also require pre-processing the flue, or other, gas stream so that it is dry (i.e., free of water), or substantially dry, so as to not cause blockage of the system due to the formation of ice.

SUMMARY OF THE DISCLOSURE

The present disclosure is directed to systems and methods for removing one or more solidifiable gas components from a process gas stream by direct contact with a cold liquid. The process gas stream includes at least one gas component that is frozen or otherwise solidified by direct contact with the cold liquid, such as in a contacting assembly, while one or more other gas components of the process gas stream remain in a gaseous state. The process gas stream may include water, and the cold liquid will have a different composition than the process gas stream. The contacting of the cold liquid with the process gas stream to form at least one solidified gas component may be performed at a pressure that is less than 200 psia, and optionally less than 100 psia, less than 50 psia, or even less than 35 psia or 30 psia, and the solidified gas component(s) may be removed from the contacting assembly as a slurry with cold liquid. In one or more embodiments, the gas-cold liquid contacting may be performed in a countercurrent manner in two or more stages. At least a portion of solids may be mechanically removed from generated slurry wherein removal occurs between at least one set of adjacent stages. The liquid-solid slurry optionally may be concentrated to increase the concentration of solidified gas component in the slurry by reducing the amount of the cold liquid in the slurry. The pressure of the slurry optionally may be increased using a liquid pump or other liquid-pressurizing mechanism, and the solidified gas components may be selectively removed from the cold liquid. Another illustrative, non-exclusive example of a suitable method for pressurizing the slurry is to heat the solids in a sealed container. When the slurry contains two or more solidified gas components, the solidified gas components may be separately and/or sequentially removed from the cold liquid, such as through heating of the slurry. The solids may be melted or vaporized and separated to form an outlet stream. As discussed herein, the outlet steam may be disposed of via a variety of mechanisms and/or a variety of applications, including disposing the outlet stream in a subsurface formation.

Figure 1:
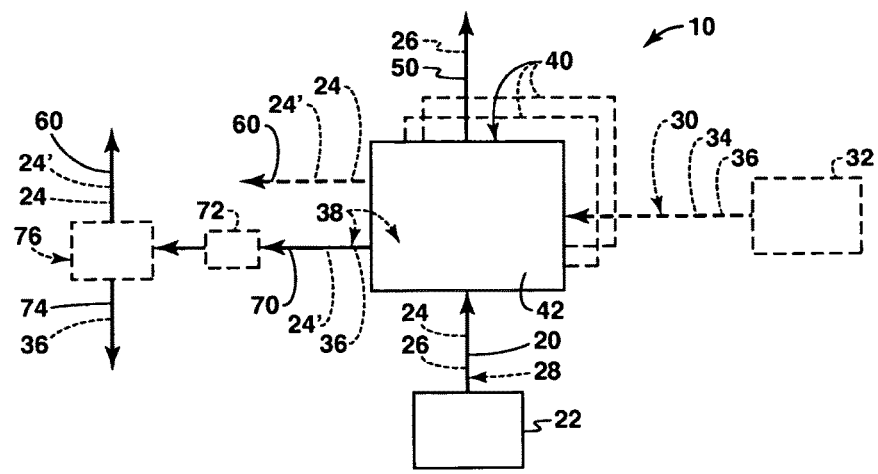
FIG. 1 is a schematic diagram of systems for removing solidifiable gas components from a gas stream by direct contact with a cold liquid according to the present disclosure.

For simplicity and clarity of illustration, elements shown in the drawings have not necessarily been drawn to scale. For example, the dimensions of some of the elements may be exaggerated relative to other elements for clarity. Further, where considered appropriate, some reference numerals are repeated in the same drawing and among the drawings to indicate corresponding or analogous elements, but not necessarily identical elements.

DETAILED DESCRIPTION AND BEST MODE OF THE DISCLOSURE

The present disclosure is directed to systems and methods for removing a solidifiable gas component from a gas stream by solidifying the solidifiable gas component with a cold liquid. As discussed in more detail herein, the systems and methods may directly contact the gas stream containing the solidifiable gas component with the cold liquid to freeze or otherwise solidify the solidifiable gas component. Through this direct contact with the cold liquid, the solidifiable gas component will freeze, or otherwise solidify, thereby removing the frozen (solidified) solidifiable gas component from the gas stream. Instead, the frozen (solidified) solidifiable gas component will form a mixture, or slurry, with the cold liquid. Thereafter, the systems and methods may separate the frozen (solidified) solidifiable gas component from the cold liquid. The separated components may then be converted to liquid or vapor, for example by heating, to form a stream for disposal or use elsewhere.

As used herein, the term "process gas stream" generally refers to any gas stream present in an industrial or commercial facility, regardless of whether the process gas stream is a reactant stream, a product stream, an intermediate (or reaction intermediary) stream, a waste (gas) stream, or an exhaust stream. Illustrative, non-exclusive examples of such industrial and/or commercial facilities include refineries, power plants, incinerators, smelters, chemical plants, natural gas treaters, and the like. Illustrative, non-exclusive examples of process gas streams from which one or more solidifiable gas components may be removed using systems and/or methods according to the present disclosure include, but are not limited to, flue gas streams and combustion exhaust streams. An additional illustrative, non-exclusive example of a process gas stream is a natural gas stream, such as which may contain carbon dioxide and/or hydrogen sulfide that may be removed with the systems and/or methods according to the present disclosure. Additionally or alternatively, a process gas stream from which one or more solidifiable gas components may be removed using systems and/or methods according to the present disclosure include, but are not limited to, streams in which a majority of the gas stream remains a gas-phase stream at the temperature and pressure in which the one or more solidifiable gas components are removed from the process gas stream by direct contact with the cold liquid.

As used herein in the context of a process gas stream from which one or more solidifiable gas components are removed therefrom according to systems and/or methods according to the present disclosure, "component" refers to a distinct chemical compound that is present in the process gas stream. Illustrative, non-exclusive examples of solidifiable gas components that may be removed from a process gas stream using systems and/or methods according to the present disclosure include carbon dioxide ($CO_2$), water ($H_2O$), hydrogen sulfide ($H_2S$), sulfur dioxide ($SO_2$), carbonyl sulfide (COS), and NOx compounds (e.g., NO and $NO_2$). These components of a process gas stream may additionally or alternatively be referred to herein as gas-phase compounds, solidifiable gas-phase compounds, and solidifiable gas components of the process gas stream.

As used herein, "freezing" is intended to broadly refer to causing a phase change of a compound, such as a compound from a process gas stream, from a gas phase to a solid phase. Accordingly, "freezing" may include the compound first changing phases from a gas phase to a liquid phase and thereafter changing phases to the solid phase. Additionally or alternatively, "freezing" may include the compound subliming, precipitating, solidifying, or otherwise changing phases from a gas phase to a solid phase. As an illustrative example, at pressures that are at or near atmospheric pressure, water, hydrogen sulfide, and carbonyl sulfide will transition from a gas phase to a liquid phase and then to a solid phase. In contrast, at pressures below its triple point pressure of 5.2 atmospheres (73.5 psi), carbon dioxide will tend to sublime from the gas phase to the solid phase at pressures below its triple point. This changing of the states, or phases, of one or more compounds of a process gas using systems and/or methods according to the present disclosure refers to a change in the state of the compound without a change in the chemical composition of the compound. Accordingly, solidifying of one or more solidifiable gas component of a process gas stream is not intended to refer to chemically reacting the component to form one or more different compounds.

A schematic diagram of illustrative, non-exclusive examples of systems for removing a solidifiable gas component from a gas stream, such as a process gas stream, is shown in FIG. 1. In FIG. 1, the systems are generally indicated at 10 and include a process gas stream 20, such as from a process gas stream source 22. A system 10 may additionally or alternatively be described as an apparatus 10 and/or a device 10 for removing one or more solidifiable gas components from a gas stream, such as process gas stream 20, by direct contact with a cold liquid. Systems 10 further include a contacting assembly 40, in which the process gas stream is contacted directly with a cold liquid 36 to freeze (or otherwise solidify) at least one solidifiable gas component 24 that is present in the process gas stream. Although not required to all systems 10 and/or methods according to the present disclosure, the cold liquid may be delivered to the contacting assembly, such as for direct contact with the process gas stream, as a cold liquid stream 30 from a cold liquid supply 32. Cold liquid supply 32, when present, may additionally or alternatively be referred to herein as a cold liquid source 32. It is also within the scope of the present disclosure that one or more of the cold liquid and the process gas stream may be present in the contacting assembly when the other of the cold liquid and the process gas stream is delivered thereto for direct contact.

As discussed, process gas stream 20 includes at least one solidifiable gas component 24, which has a freezing point at which the solidifiable gas component will freeze, solidify, or otherwise change states from a gas phase to a solid phase when contacted by cold liquid 36 in contacting assembly 40 at the operating conditions in the contacting assembly. As used herein, "operating conditions" refers to at least the temperature and pressure of an identified stream, device, assembly, etc. In the context of the temperature and pressure at which a solidifiable gas component is frozen or otherwise solidified by direct contact with cold liquid 36 in contacting assembly 40, the temperature and pressure may respectively be referred to as the contacting temperature and the contacting pressure.

Process gas stream 20 also will include one or more other gas, or gas-phase, components 26 that remain in the gas phase at the operating conditions at which the solidifiable components 24 are frozen in the contacting assembly by direct contact with the cold liquid. As such, these other gas-phase components 26 of process gas stream 20 may be referred to as non-solidifiable gas components and/or non-solidifiable gases 26, at least in the context of operating conditions present in the contacting assembly. Furthermore, this reference to these other gas-phase components as being non-solidifiable gas components of the process gas stream does not require that these other components are not capable of being frozen or otherwise solidified at other temperatures and/or pressures. Instead, it refers to these other gas-phase components having a freezing point that is lower than the contacting temperature in the contacting assembly.

The solidifiable and non-solidifiable components 24, 26 of the process gas stream collectively may be referred to as the components, or the gas-phase components, 28 of the process gas stream. Although not required to all systems 10 and/or methods according to the present disclosure, the one or more solidifiable gas components 24 typically will each, and in some embodiments will collectively, form a minority component of the overall composition of the process gas stream. It is within the scope of the present disclosure that process gas stream 20 may include two or more solidifiable gas components, and that these two or more solidifiable gas components may have different compositions and different freezing and/or boiling points.

In many process gas streams 20, such as many process gas streams that are, or include, flue gas streams, nitrogen gas ($N_2$) will form a majority component of the process gas stream and may be described as being a non-solidifiable gas component 26 at the operating conditions of contacting assembly 40. As used herein, "majority" and "minority" refer to the percentage of a component, or group of components, in a stream, such as process gas stream 20. A majority, or majority component, of a stream refers to the greatest percentage of a component or group of components present in the gas stream. This greatest percentage will often, but is not required to, form or otherwise represent at least 50% of the corresponding stream. A minority, or minority component, of a stream refers to a component, or group of components, that are present in an amount that is less than one or more other components, including the majority component, or group of components. Accordingly, a minority component of a stream will form or otherwise represent less than 50% of the stream, and may represent less than 25% of the stream. Unless otherwise indicated herein, these percentages are molar percentages, or mol %.

As discussed, illustrative, non-exclusive examples of solidifiable gas components 24 that may be present in process gas stream 20, and which may be removed therefrom by direct contact with cold liquid 36 in the contacting assembly, include carbon dioxide ($CO_2$), water ($H_2O$), hydrogen sulfide ($H_2S$), sulfur dioxide ($SO_2$), mercaptans (RSH), and carbonyl sulfide (COS). It is within the scope of the present disclosure that process gas stream 20 may include water as a solidifiable gas component 24, although a dehydrated, or dry, process gas stream 20 that does not include appreciable water (i.e., less than approximately 200 ppm (parts per million) water on a mass basis) also is within the scope of the present disclosure. Many process gas streams 20 according to the present disclosure will include carbon dioxide as a solidifiable gas component 24, and in some such systems 10 and/or methods, carbon dioxide will form a majority of the solidifiable gas components present in the process gas stream. However, it is not required for all systems 10 and/or methods according to the present disclosure to be used to remove carbon dioxide from a process gas stream by freezing the carbon dioxide by direct contact with cold liquid 36 in contacting assembly 40.

By way of illustration, and not limitation, freezing and boiling points of an illustrative, non-exclusive list of gas components 28 that may (but are not required to) be present in a process gas stream 20 are presented in Table 1.

TABLE 1

| Compound Name | Compound Formula | Reference Pressure (atm) | Freezing Point (° C.) | Boiling Point (° C.) |
|---|---|---|---|---|
| Carbon Dioxide | $CO_2$ | 5.2 (triple point) | −56.6 | −56.6 |
| Carbon Dioxide | $CO_2$ | 1 (sublimes) | −78.5 | −78.5 |
| Hydrogen Sulfide | $H_2S$ | 1 | −85.5 | −60.7 |
| Carbonyl Sulfide | COS | 1 | −138.0 | −50.0 |
| Sulfur Dioxide | $SO_2$ | 1 | −75.5 | −10.0 |
| Nitrogen Dioxide | $NO_2$ | 1 | −11.2 | 21.1 |
| Nitrogen | $N_2$ | 1 | −209.9 | −195.8 |
| Oxygen | $O_2$ | 1 | −218.4 | −183.0 |
| Water | $H_2O$ | 1 | 0 | 100 |

Without limiting all systems 10 and/or methods according to the present disclosure, in the following discussion, process gas stream 20 may be referred to as a flue gas stream that contains nitrogen gas as the majority non-solidifiable gas component 26 and solidifiable gas components 24 that include carbon dioxide as the most prevalent, or majority, solidifiable gas component and one or more of water, hydrogen sulfide, sulfur dioxide, and carbonyl sulfide as minority solidifiable gas components. However, it is within the scope of the present disclosure that the systems and methods disclosed herein may be applied to process gas streams other than flue gas streams and that the solidifiable gas component may be a component of the gas stream other than, or in addition to, carbon dioxide.

Cold liquid 36 should be a liquid, i.e., in a liquid phase, at the contacting temperature and pressure, namely, the temperature and pressure at which the process gas stream is contacted directly with the cold liquid to freeze at least one solidifiable gas component of the process gas stream. Expressed in different terms, cold liquid 36 may have, and additionally or alternatively may consist of, one or more components that have a freezing point that is less than the temperature at which the cold liquid is contacted with the process gas stream and/or less than the temperature at which a corresponding cold liquid stream 30 is delivered to contacting assembly 40. Cold liquid 36, and (when present) cold liquid stream 30, thus may be described as including, or being formed from, one or more liquid components 34. Cold liquid stream 30 and cold liquid 36 will have a different overall composition from process gas stream 20, and will include at least one component that is not present in the process gas stream. It is within the scope of the present disclosure that cold liquid stream 30 and cold liquid 36 may not include any of the components (or compounds) that are present in the process gas stream, but this is not required to all systems 10 and/or methods to the present disclosure.

Cold liquid 36, and optionally cold liquid stream 30 prior to delivery to contacting assembly 40, may be cooled to such illustrative, non-exclusive temperatures of less than −80° C., less than −100° C., less than −120° C., less than −140° C., −90° C. to −110° C., −110° C. to −130° C., and/or −120° C. to −140° C. prior to contacting the process gas stream. Although not required to all systems 10 and/or methods according to the present disclosure, cold liquid 36 may be selected to have low solubility of the solidifiable gas components 24 present in process gas stream 20, and may be selected to be liquid (i.e., in a liquid phase) at ambient conditions (i.e., at a temperature of 20° C. and a pressure of 1 atmosphere (atm) (14.7 psi)). Expressed in slightly different terms, cold liquid 36 may be selected so that the at least one solidifiable gas component 24 that is desired to be removed from the process gas stream has a low solubility in the cold liquid. As an illustrative, non-exclusive example, "low solubility" may refer to a solubility of 10 mol % or less in the cold liquid at the operating conditions of the contacting assembly, 5 mol % or less in the cold liquid at the operating conditions of the contacting assembly, or even 1 mol % or less in the cold liquid at the operating conditions of the contacting assembly.

Illustrative, non-exclusive examples of suitable liquid components, or compositions, 34 of cold liquid 36 include non-oxygenated hydrocarbons, such as liquid isoalkanes, isoalkenes, mixtures thereof, alcohols, and alcohol mixtures. In some embodiments, the mixtures may have compositions resulting in eutectic, or near-eutectic, freezing points. Illustrative, non-exclusive examples of suitable isoalkanes include light liquid isoalkanes, such as isopentanes, isohexanes, and mixtures thereof. As specific illustrative, non-exclusive examples, 3-methylpentane has a freezing point of −163° C., 1-hexene has a freezing point of −140° C., and a mixture of 58 wt % ethanol and 42 wt % methanol has a freezing point of −140° C.

As discussed, in contacting assembly 40, process gas stream 20 is contacted directly with cold liquid 36 to freeze at least one of the solidifiable gas components 24 of the process gas stream. Accordingly, the one or more solidifiable gas components 24, when frozen or otherwise solidified by contact with the cold liquid, may be referred to as frozen gas(es) 24', solidified gas(es) 24', and/or solidified gas component(s) 24'. Frozen gases 24' may additionally or alternatively be referred to as frozen gas components 24' of the process gas stream, and/or solidified gas components 24' of the process gas stream. References herein to these frozen gases 24' should not be construed as requiring or excluding the presence of two or more different frozen solidifiable gas components. Instead, frozen gases 24' may refer generally to the one or more solidifiable gas components 24 that are frozen by direct contact with cold liquid 36 in contacting assembly 40.

Contacting assembly 40 provides at least one vessel, chamber, and/or other suitable contacting structure 42, in which process gas stream 20 that is delivered to the contacting assembly and directly contacted with cold liquid 36 to freeze or otherwise solidify one or more solidifiable gas components 24 of the process gas stream. Illustrative, non-exclusive examples of suitable contacting structure 42 include one or more spray towers, bubble columns, bubble contactors, tanks, or other suitable vessels in which the process gas stream is contacted directly with the cold liquid. This direct contacting of the process gas stream with the cold liquid may provide for a high heat transfer rate between the cold liquid and the process gas stream, namely, a greater heat transfer rate than if indirect heat exchange methods and/or devices were utilized to cool the process gas stream with the cold liquid.

This contacting may be accomplished in any suitable manner and/or process, and may include co-current and/or concurrent contacting of the liquid and the process gas stream. In some systems 10 and/or methods according to the present disclosure, the process gas stream may be described as being contacted with droplets, or individual drops, of the cold liquid. In such embodiments, the contacting assembly may be configured or otherwise structured to form these droplets from the cold liquid, such as when delivered to the contacting assembly as a cold liquid stream 30. The direct contact of the process gas stream with droplets of the cold liquid, when utilized in systems 10 and/or methods according to the present disclosure, may provide for formation of solids, namely, solidified gas 24', away from the walls, fluid inlets, and/or fluid outlets of the contacting assembly and/or contacting structure. For example, this may reduce the likelihood of fouling or other inoperability of the system due to undesirable solid formation and/or accumulation.

Cold liquid 36 is typically present in, and/or delivered to, contacting assembly 40 at a suitable temperature and pressure for solidifying the one or more solidifiable gas components 24 of process gas stream 20 when the cold liquid is contacted directly with the cold gas stream. As discussed, this temperature will result in freezing or other solidification of the one or more solidifiable gas components while one or more non-solidifiable gas components 26 of the process gas stream will remain in a gas-phase, or as gaseous components. While not required to all systems 10 and/or methods according to the present disclosure, process gas stream 20 and cold liquid 36 may be at relatively low pressures when directly contacted with each other, and the process gas stream 20 (and cold liquid stream 30, when present) may be delivered to the contacting assembly at such a relative low pressure as well. In other words, it is within the scope of the present disclosure that the freezing of a solidifiable gas component 24 of the process gas stream occurs without requiring throttling, Joule-Thompson expansion, or similar pressure-driven processes in contacting assembly 40. As illustrative, non-exclusive examples, the process gas stream and the cold liquid may contact each other, and optionally may be delivered to the contacting assembly, at pressures of less than 200 psia, less than 150 psia, less than 100 psia, less than 50 psia, less than 30 psia, or even less than 20 psia. In some embodiments, the gas stream may be compressed prior to being delivered to the contacting assembly; however, minimizing the need for compression is generally preferred (although not required) so as to reduce energy usage. It is additionally or alternatively within the scope of the present disclosure that the process gas stream, the cold liquid, and the cold liquid stream (when present) are delivered to the contacting assembly and into contact with each other at or near ambient pressures and/or at or near the pressure within the contacting assembly. In the context of pressures, "at or near" is meant to include pressures that are within 20 psia, or even 10 psia or 5 psia, of the corresponding reference pressure.

In FIG. 1, contacting assembly 40 is schematically illustrated with a solid lead line to graphically represent that it is within the scope of the present disclosure for the contacting assembly to include only a single stage, or contacting structure. In FIG. 1, contacting assembly 40 is also illustrated with dashed lead lines to graphically represent that it is within the scope of the present disclosure for the contacting assembly to include a plurality of stages, or contacting structures. A stage or contacting structure of a contacting assembly refers to a discrete structure or zone of a contacting assembly in which the cold liquid and process gas stream are directly contacted with each other, such as prior to, at the same time as, and/or after contacting of the cold liquid and the process gas stream in a different state or contacting structure of the contacting assembly. When the contacting assembly includes a plurality of stages or contacting structures, these stages or contacting structures may be operated in series or in parallel without departing from the scope of the present disclosure.

The process gas stream from which at least one solidifiable component 24 has been removed in contacting assembly 40 may be referred to as a treated gas stream 50 and will include at least a majority, if not all, of the non-solidifiable gas components 26 of the process gas stream. Accordingly, treated gas stream 50 may additionally or alternatively be described as having a reduced, or lower, concentration of solidifiable gas component(s) 24 than the process gas stream. Although not required, it is within the scope of the present disclosure that treated gas stream 50 may be free, or substantially free, of the solidifiable gas component(s) that are frozen by direct contact with the cold liquid. Such a treated gas stream 50 may additionally or alternatively be described as not including any of the solidifiable gas component that was removed from the process gas stream by direct contact with the cold liquid. As indicated schematically in FIG. 1, treated gas stream 50 may be removed from the contacting assembly, such as for disposal, venting, storage, or use. In some systems 10 and/or methods according to the present disclosure, the treated gas stream may be vented to the environment, optionally after first using the stream as a cooling, or heat exchange, stream due to the cold temperature at which the stream exits, or is exhausted from, in contacting assembly 40.

The frozen gases 24' that are removed from the process gas stream in contacting assembly 40 are at least initially mixed with cold liquid 36 in the contacting assembly. This mixture of the frozen (solidified) gases and cold liquid 36 may be referred to herein as a slurry 38, as it will be a mixture of liquid and solid components. The relative concentration of solids (i.e., the frozen gases 24' that are mixed with the cold liquid) may vary within the scope of the present disclosure. Because the formed solids, namely, frozen gases 24', are mixed with the cold liquid, the solids may be transported within the contacting assembly and/or from the contacting assembly, by pumping or otherwise transporting the slurry utilizing suitable liquid-transport devices and/or techniques. Additionally or alternatively, while present in slurry 38, the frozen gases may be transported with the cold liquid, and thus without requiring devices and/or techniques that are designed primarily to transport solids.

The frozen gases may thereafter be separated from the cold liquid to form a removed stream 60, which may thereafter be vented to the environment, used, stored, etc. Illustrative, non-exclusive examples of uses for the removed gas stream include sequestering the removed gas stream in a subsurface, or subterranean region, and to aid in oil recovery processes, such as to recover oil from a subsurface, or subterranean region. This separation of frozen gas(es) 24' from cold liquid 36 may be accomplished through a variety of processes, including physical separation processes and separation processes in which the frozen gases are heated to a temperature at which they are again in the gas phase (i.e., are again solidifiable gases 24 or solidifiable gas components 24), as discussed in more detail herein. Additionally or alternatively, the concentration of the frozen gases in the cold liquid may be increased prior to any such separation of the frozen gases from cold liquid 36 and/or prior to removal of a slurry of the frozen gases and at least a portion of the cold liquid from the contacting assembly. As an illustrative, non-exclusive example, some of the cold liquid may be removed from the slurry so that the relative concentration of the frozen gases in the slurry is increased. The liquid removed from the slurry may be recycled to form initial cold liquid used for contacting the gas stream. The liquid separated from the slurry may be cooled by heat exchange with at least a portion of the treated gas stream.

Frozen gases 24' may be separated from the cold liquid in contacting assembly 40 and removed from the contacting assembly as removed stream 60, such as indicated schematically in FIG. 1. As indicated, removed gas stream 60 may be formed from frozen gases 24' and/or solidifiable gases 24, depending upon the temperature and/or pressure of the components of removed stream 60 when removed from the contacting assembly. When removed stream 60 is formed entirely of gas-phase components, such as solidifiable gas components 24', removed stream 60 may be referred to as a removed gas stream 60. Additionally, or alternatively, these frozen gases and at least a portion of the cold liquid 36 present in the contacting assembly may be removed from the contacting assembly as a slurry stream 70, which also may be referred to as mixed-phase stream 70. The frozen gases may thereafter be removed from slurry stream 70, such as to form removed stream 60, as is also schematically illustrated in FIG. 1. As discussed in more detail herein, the removed stream may contain solidifiable gas components 24 in a gas, liquid, and/or solid phase. Regardless of the phase, or phases, of the components thereof, the one or more removed streams 60 contain one or more solidifiable gas components that were removed from process gas stream 20.

As indicated in FIG. 1, the pressure of slurry stream 70 may be increased using a liquid pump 72, which may result in an increase the pressure of a removed gas stream without requiring a compressor to do so. Accordingly, it is within the scope of the present disclosure that the removed gas stream 60 may have a pressure that exceeds the pressure of process gas stream 20, with this pressure (or this increased pressure) of removed gas stream 60 being obtained without utilizing a compressor to compress the removed gas stream. Although not required to all systems 10 and/or methods according to the present disclosure, a separation assembly, or separation unit, 76 may be utilized to provide this separation of the cold liquid from the frozen gases 24' and/or solidifiable gas component(s) 24 (depending upon the gas or liquid state thereof). When the separation assembly removes the frozen gases from the cold liquid by heating of the slurry to return the frozen (solidified) gases to a gas phase, the separation assembly may be referred to as a gas separator 76 and/or as a gas separation assembly. The cold liquid present after removal of the frozen gases is indicated in FIG. 1 as resultant, or residual, cold liquid stream 74 and may be disposed of, recycled, recooled (such as due to being warmed from contact with the process gas stream) and recycled, used for other purposes, etc. If returned to a cold liquid supply 32, the resultant cold liquid stream may be referred to as a recycle stream 74 and/or as a cold liquid recycle stream 74.

Figure 2:
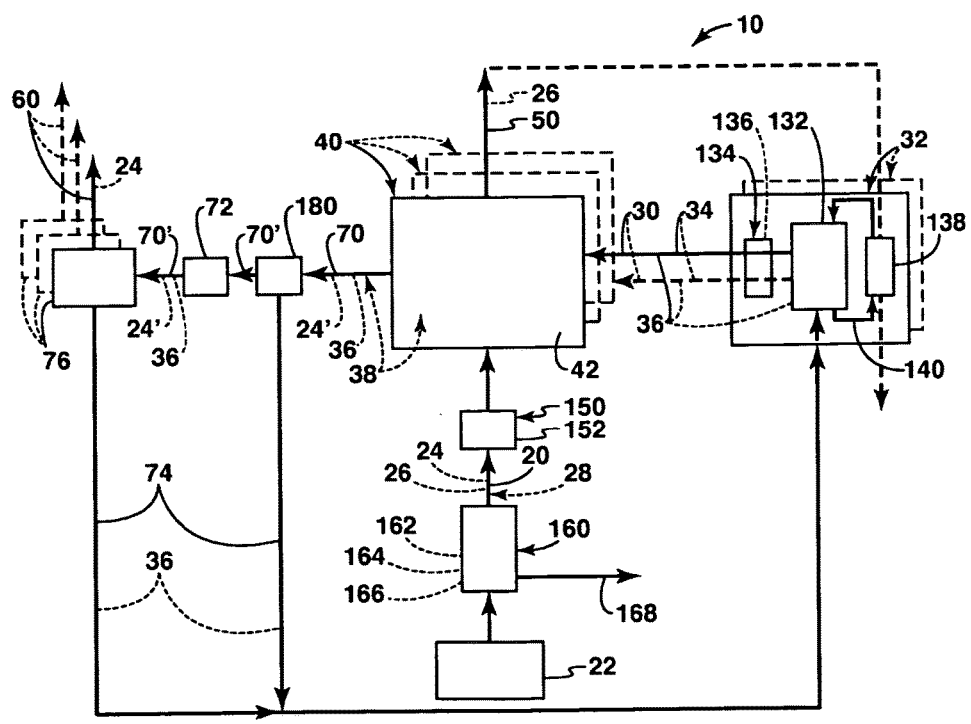
FIG. 2 is another schematic diagram of systems for removing solidifiable gas components from a gas stream by direct contact with a cold liquid according to the present disclosure.

Additional illustrative, non-exclusive examples of systems 10 for removing one or more solidifiable gas, or solidifiable gas component, 24 from a process gas stream 20 are schematically illustrated in FIG. 2. The systems 10 of FIG. 2 are similar to those of FIG. 1, except cold liquid supply 32 is positively illustrated as a component of the systems, namely, as the source from which cold liquid stream 30 is delivered to contacting assembly 40. Cold liquid stream 30 contains one or more liquid components 34 that collectively form cold liquid 36. Cold liquid stream 30 is delivered to the contacting assembly at a temperature and pressure for freezing one or more solidifiable components 24 from the process gas stream, which as discussed, may include a temperature below the freezing (or sublimation) point of the solidifiable gas component(s) and a relatively low contacting pressure, of which illustrative, non-exclusive examples are discussed herein.

The illustrative, non-exclusive example of a cold liquid supply 32 shown in FIG. 2 is schematically illustrated as including a cold liquid reservoir 132 that contains a volume of cold liquid 36. It is within the scope of the present disclosure that other cold liquid supplies 32 may be utilized with the systems 10 of FIG. 2 and/or that the cold liquid supply 32 shown in FIG. 2 may be used with other systems 10 and/or methods according to the present disclosure. As illustrated in FIG. 2, the cold liquid reservoir is in fluid communication with contacting assembly 40, and the cold liquid supply may deliver cold liquid stream 30 to the contacting assembly through the use of a suitable delivery mechanism 134, such as a liquid pump 136. It is additionally or alternatively within the scope of the present disclosure that the cold liquid reservoir 132 may be maintained at a suitable pressure to drive, or propel, cold liquid 36 to flow as cold liquid stream 30 from the cold liquid reservoir to the contacting assembly.

Also shown in the cold liquid supply 32 of FIG. 2 is a cooling assembly 138 that maintains the cold liquid 36 in cold liquid reservoir 132 at a suitable temperature, such as at or near (i.e., at or below at least 5° C., 10° C., 20° C. of) a suitable contacting temperature for freezing one or more solidifiable gas components of the process gas stream. Cooling assembly 138 may include a refrigeration mechanism or other suitable mechanism or device for providing cooling to the cold liquid in cold liquid reservoir 132. Accordingly, cooling assembly 138 may additionally or alternatively be referred to as a refrigeration mechanism or a refrigeration assembly.

Cooling assembly 138 may utilize any suitable mechanism or process for providing the desired cooling (or re-cooling) of the cold liquid, such as heat exchange with a colder gas stream, and expansion and/or phase-change of a gas or other refrigerant. As an illustrative, non-exclusive example, a refrigerant may be expanded to cool the refrigerant to a suitable temperature for cooling the cold liquid to a suitable temperature, such as a temperature that is at or below a desired contacting temperature. Illustrative, non-exclusive examples of suitable refrigerants include methane, ethane, propane, and mixtures thereof, although others may be used.

Any suitable heat exchange structure and/or mechanism may be utilized to provide this cooling of the cold liquid. In FIG. 2, a cooling conduit 140 is shown providing a liquid conduit, or loop, between the cold liquid reservoir and the cooling assembly, but this is not required to all cold liquid supplies according to the present disclosure. If there is a potential for solids formation on the refrigeration surfaces, such as if dissolved gases in the recycled cold liquid may freeze out (i.e., solidify) upon re-cooling of the cold liquid, a scraped heat exchanger is an illustrative, non-exclusive example of a suitable heat exchange structure. As additional, non-exclusive optional examples, the heat exchange structure may utilize coatings, surface polishing, vibration mechanisms, and/or swirling of the cold liquid to reduce the formation of solids on the refrigeration surfaces and/or to erode any such formed solids. It is within the scope of the present disclosure that treated gas stream 50 optionally may be used to cool the refrigerant (prior to expansion) and/or to cool the cold liquid recycle stream (when the treated gas stream is colder than the cold liquid recycle stream). Additionally or alternatively, the potential for solid formation on the refrigeration surfaces may be suppressed prior to further cooling of the cold liquid. A non-exclusive example is to contact a portion of the treated gas with the cold stream, thereby stripping the cold stream of a portion of the solidifiable gas component that might otherwise cause the solid formation on the refrigeration surfaces.

In the illustrative systems 10 of FIG. 2, process gas stream 20 is shown being delivered to contacting assembly 40 from a process gas stream source 22 by a gas delivery mechanism 150. While not required to all systems 10 according to the present disclosure, and as discussed herein, it is within the scope of the present disclosure that the process gas stream is delivered to the contacting assembly at a relatively low pressure, such as a pressure that is at or near ambient pressure. In such a configuration, gas delivery mechanism 150 may include, or be, a fan or blower 152, as opposed to a compressor or similar structure that may be needed if the process gas stream is to be delivered to the contacting assembly at higher pressures.

Also shown in FIG. 2 is an optional water-removal assembly 160 that is configured to remove water from process gas stream 20 prior to delivery of the stream to contacting assembly 40. As used herein, "removal" of a component of a stream includes reducing the concentration of this component, but does not require complete removal of this component from the stream. Accordingly, water-removal assembly 160, when present, is configured to reduce the concentration of water in the process gas stream, and may (but is not required to) completely remove water from the process gas stream. When a water-removal assembly 160 is utilized, process gas stream 20 may be referred to as a hydrated, or humidified, process gas stream prior to having water removed therefrom by the water-removal assembly. Additionally or alternatively, the process gas stream may be referred to as a dehydrated, or dehumidified, process gas stream after having water removed therefrom by the water-removal assembly.

Water removal assembly 160 may include any suitable structure and/or utilize any suitable process for removing water from the process gas stream. As an illustrative, non-exclusive example, water-removal assembly 160 may include a desiccant or other adsorbent bed, or adsorbent material, 162 that removes water from the process gas stream. As another illustrative, non-exclusive example, water-removal assembly 160 may include a liquid-gas separator, or water knock-out, 164 that removes liquid water present in the process gas stream. Water-removal assembly 160 optionally may include, or be used in combination with, a condenser or other pre-cooling assembly 166 that reduces the temperature of the process gas stream, such as via heat exchange, before delivery of the process gas stream to contacting assembly 40. This cooling of the process gas stream may condense liquid water from the process gas stream. Water removed from the process gas stream may be removed from the water-removal assembly as a liquid water stream 168.

In FIG. 2, a slurry 38 (liquid-solid mixture) of cold liquid 36 and solidified gas 24' from process gas stream 20 is shown being withdrawn from contacting assembly 40 as a slurry stream 70. Slurry stream 70 may have a greater concentration of solidified gas 24' than is present in the cold liquid remaining in the contacting assembly, such as by withdrawing the slurry stream from a region of the contacting assembly that contains more solidified gas 24' than other regions. FIG. 2 also demonstrates that systems 10 according to the present disclosure may optionally include a solid-liquid separator 180 that increases the concentration of solidified gas 24' in the slurry stream by removing cold liquid 36 from the slurry stream. As shown, the cold liquid that is removed by solid-liquid separator 180 forms a resultant liquid stream 74, which as discussed herein may be utilized in system 10, recycled, utilized for other purposes, disposed of, etc. Slurry stream 70 may be referred to as a concentrated slurry stream 70' having cold liquid removed therefrom and/or having the concentration of solidified gases being increased therein by solid-liquid separator 180. Illustrative, non-exclusive examples of suitable solid-liquid separators 180 include one or more non-mechanical or mechanical methods of separation such as a centrifugal separator, a filter, a static centrifugal separator, or a settling tank. In the context of a static centrifugal separation being used with a isohexane as a cold liquid and water and carbon dioxide as the frozen gases 24', cold isohexane has a density that is sufficiently different than that of solid carbon dioxide and water (ice) to provide for suitable removal of a substantial portion of the cold liquid from the solidified gases. As alternatives to use of static centrifugal separation, other applicable solid-liquid separation methods include batch filtration with cake discharge, continuous filtration with cake discharge, batch centrifugal sedimentation, and continuous centrifugal sedimentation. When utilize, solid-liquid separation using filters may be performed with or without presses, e.g. press rollers or screws. In some embodiments, a filter may consist of a sintered metal filter. Additionally, solid-liquid separator systems may comprise a mechanical moving scraper.

Systems 10 may further include a pump 72 or other suitable mechanism for increasing the pressure of slurry stream 70, which as discussed is a liquid stream that contains frozen gases 24'. In FIG. 2, the pump, when present, may be located downstream of the liquid separator, when present. As used herein, "upstream" and "downstream" refer to the relative position of the corresponding components or elements with respect to the direction of flow of a corresponding stream. Thus, in the context of slurry stream 70, liquid separator 180 of FIG. 2 is shown downstream of the contacting assembly because it receives the slurry stream from the contacting assembly, and separation assembly 76 is downstream of liquid separator 180 because the slurry stream flows from the liquid separator to the separation assembly.

In FIG. 2, separation assembly 76 is shown receiving slurry stream 70 (or concentrated slurry stream 70', as the case may be) and separating the stream into a resultant cold liquid stream 74 and at least one removed stream 60. As discussed, removed stream 60 may contain solidifiable gas components 24 in a solid, liquid, and/or gas phase. Accordingly, and depending upon the phase of the solidifiable gas component(s) present in a particular removed stream 60 that is produced in a separation assembly 76, the separation assembly may be referred to as a gas-liquid separator, a liquid-liquid separator, and/or a solid-liquid separator. As illustrated, the resultant cold liquid stream 74 may form a recycle stream that returns, or recycles, cold liquid 36 from the gas separator to cold liquid supply 32, such as to a cold liquid reservoir 132 thereof. One or more liquid pumps, or other suitable propulsion mechanism, may be utilized to propel cold liquid stream 74 to the cold liquid supply.

As also schematically illustrated in FIG. 2, the system may include two or more separation assemblies 76, such as to produce two or more removed streams 60. Additionally, or alternatively, the separation assembly(ies) may be described as being configured to selectively produce one or more removed streams 60 containing the solidifiable gas components 24 that were delivered to the separation assembly(ies) as solidified gas 24' in slurry stream 70. The removal of these gases may be performed via any suitable process, with an illustrative, non-exclusive example being heating of the slurry to a temperature at which the solidified gas returns to a gaseous state, which also may be referred to herein as a gas phase. This heating of the slurry may be performed in one or more steps, or stages, such as to selectively cause two or more solidified gases to sequentially return to the gas phase, thereby providing separate resultant gas streams that respectively contain primarily, if not exclusively, one of the solidifiable gas components that was removed from the process gas stream, and thereafter from the slurry. As an illustrative, non-exclusive example, if the slurry contains cold liquid 36, solid carbon dioxide, and solid water (i.e., ice), heating the slurry to a temperature at which the carbon dioxide returns to the gas phase while the water remains in a solid phase will permit selective separation of the carbon dioxide (as a removed stream 60) from the cold liquid and from the water, which remains a solid that is mixed in the slurry. An illustrative, non-exclusive example of such a temperature, at a pressure of 14.7 psia, is a temperature of at least $-78.5°$ C. and less than $100°$ C. Further heating of the slurry to a temperature at which the water returns to a gas phase (i.e., a temperature of at least $100°$ C. at a pressure of 1 atm) permits separation of the water (as another removed stream 60) from the cold liquid.

In some systems 10 and/or methods according to the present disclosure, one or more of the solidifiable gas components may be heated from the solid phase present in slurry 70 to a liquid phase, which may or may not be soluble in the cold liquid. Further heating of the slurry may result in the solidifiable gas component returning to the gas phase, and thereby being separated from the cold liquid of the slurry. Additionally or alternatively, separation assembly 76 may include a liquid-liquid separator to remove the liquid-phase solidifiable gas component from the cold liquid. It should be understood from the context of the preceding discussion that the temperature of cold liquid 36 may vary within the scope of the present disclosure, such as depending upon the configuration of a particular system 10 and/or depending upon where in the system the temperature of the cold liquid is measured.

Similar to FIG. 1, contacting assembly 40 is schematically illustrated in FIG. 2 with solid and dashed lead lines to graphically represent that it is within the scope of the present disclosure for the contacting assembly to include only a single stage, or contacting structure, or that it may include a plurality of stages, or contacting structures. Likewise, FIG. 2 also schematically illustrates cold liquid supply 32 and separation assembly 76 in solid and dashed lead lines to graphically represent that it is within the scope of the present disclosure for system 10 to include only a single cold liquid supply (and/or a single cold liquid and/or a single cold liquid reservoir) and/or a single separation assembly, or that system 10 optionally may include a plurality of cold liquid supplies (and/or a plurality of cold liquids and/or a plurality of cold liquid reservoirs, cooling assemblies, etc.) and/or a plurality of separation assemblies.

As a continued illustrative, non-exclusive example, a system 10 and/or method according to the present disclosure may utilize a first cold liquid to remove one or more solidifiable gas components, which may include water, from the process gas stream, and a second cold liquid to remove one or more other solidifiable gas components, which may include carbon dioxide, from the process gas stream. Such a configuration may permit the use of cold liquids that are maintained at different contacting temperatures and/or the use of a cold liquid in which one or more of the original solidifiable gas components of the process gas stream has more than a desired, or acceptable, solubility (so long as this solidifiable gas component is removed from the process gas stream by direct contact with the other cold liquid prior to contacting the process gas stream with the cold liquid).

Figure 3:
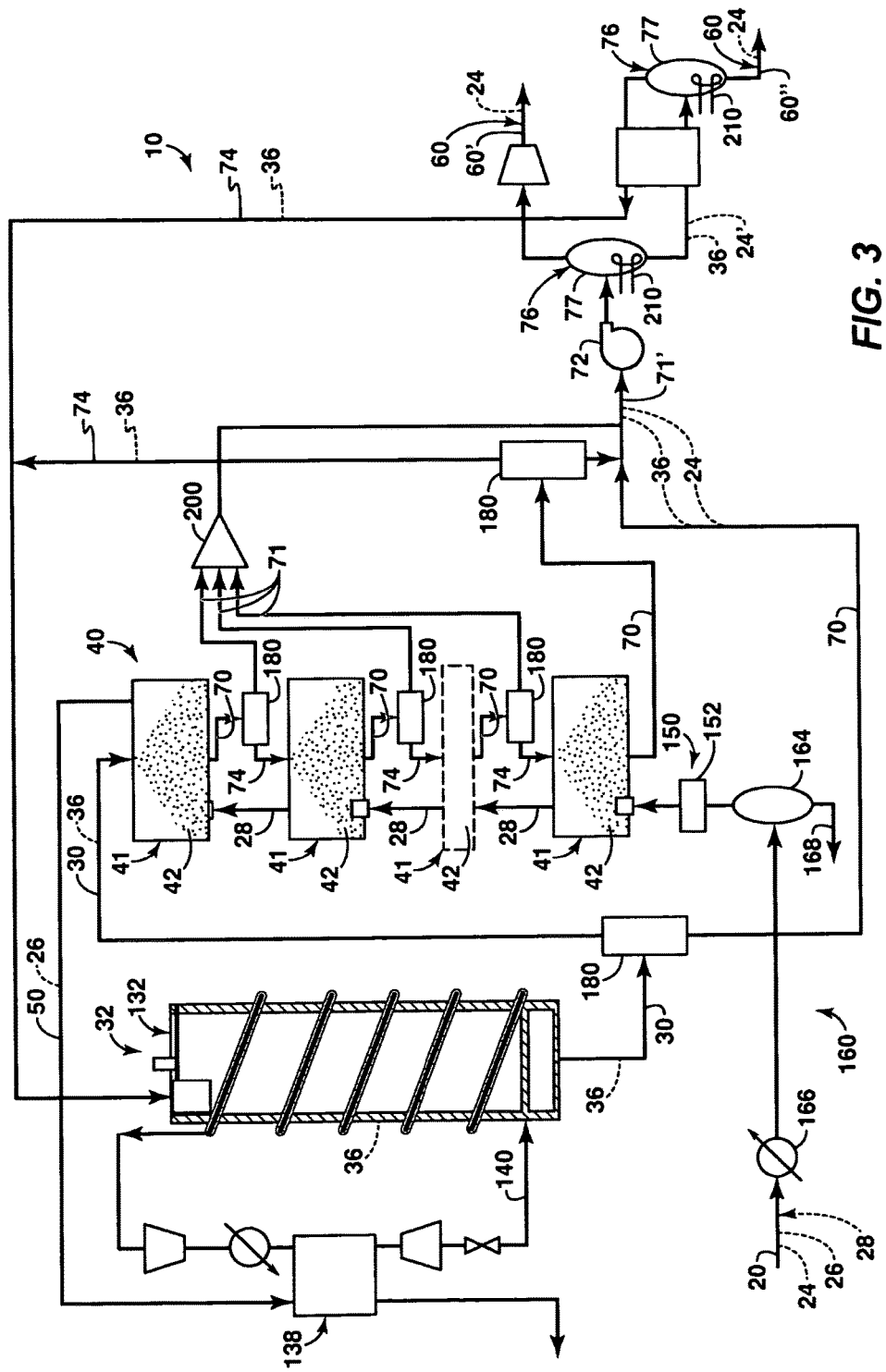
FIG. 3 is another schematic diagram of systems for removing solidifiable gas components from a gas stream by direct contact with a cold liquid according to the present disclosure.
Figure 4:
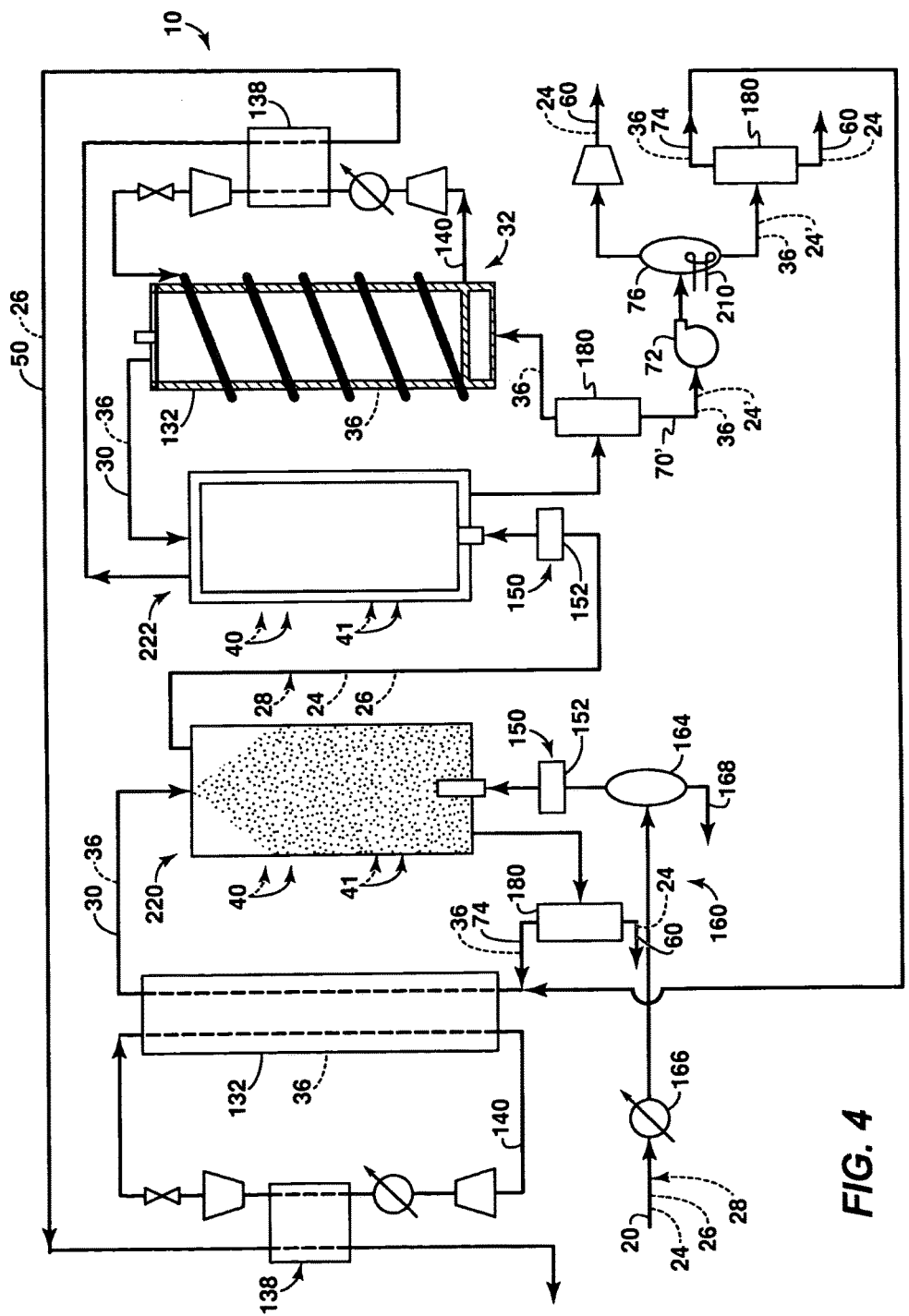
FIG. 4 is another schematic diagram of systems for removing solidifiable gas components from a gas stream by direct contact with a cold liquid according to the present disclosure.
Figure 5:
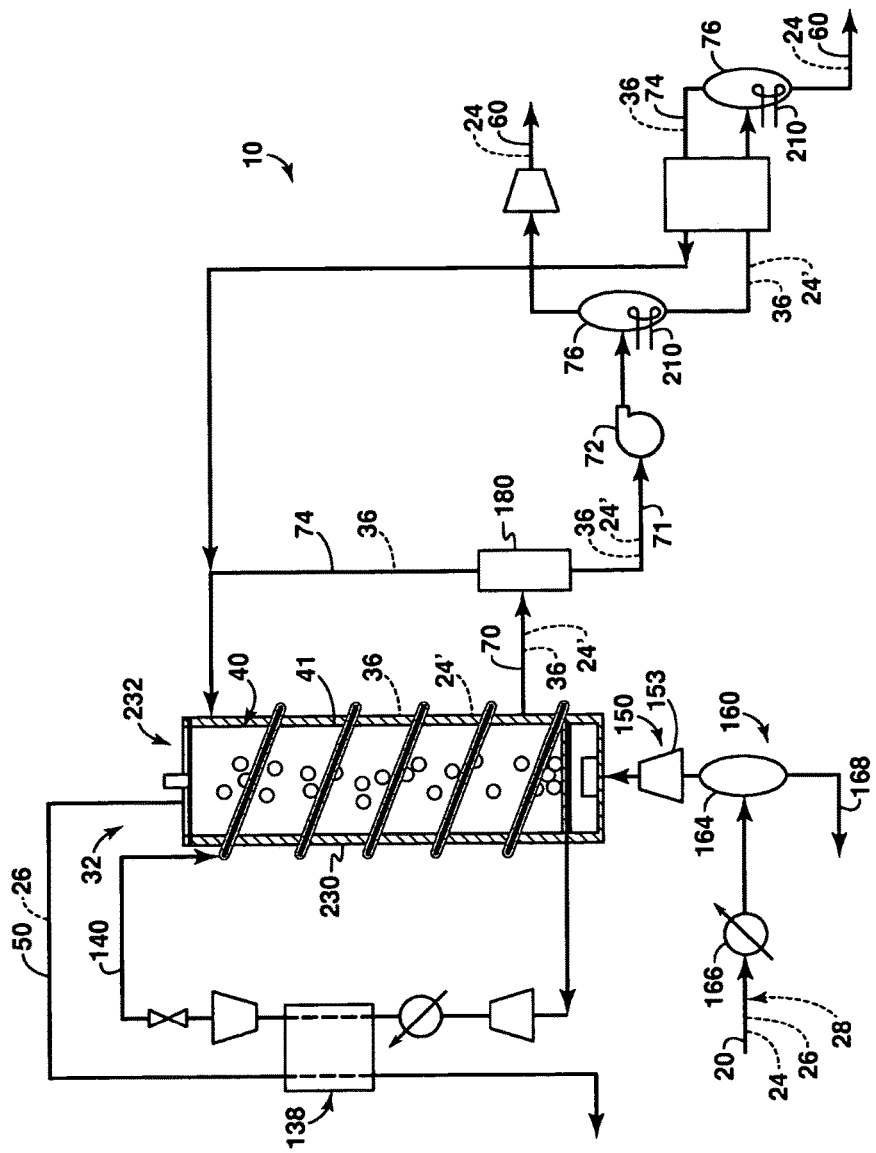
FIG. 5 is another schematic diagram of systems for removing solidifiable gas components from a gas stream by direct contact with a cold liquid according to the present disclosure.

FIGS. 3-5 provide additional illustrative, non-exclusive examples of systems 10 for removing one or more solidifiable gas components from a process gas stream by direct contact with a cold liquid according to the present disclosure. The Figures, including previously discussed FIGS. 1-2, and presently discussed FIGS. 3-5, of the present disclosure are not intended to be drawn to scale, as they have been presented to emphasize and illustrate various aspects of the present disclosure. In the Figures, the same reference numerals designate like and corresponding, but not necessarily identical, elements through the various drawing Figures. Accordingly, when like-numbered elements are shown in two or more Figures, they may not be discussed in each such Figure, and it is within the scope of the present disclosure that the preceding discussion shall apply unless otherwise indicated. Similarly, where like-numbered elements, including illustrative values, compositions, variants thereof, and the like, are described in two or more portions of the present disclosure and/or in connection with two or more Figures, it is within the scope of the present disclosure that these illustrative values, compositions, variants thereof, and the like may be applied even if not repeated in the discussion at each occurrence.

In FIG. 3, contacting assembly 40 is illustrated as including at least three stages, or contacting units, 41, and it is within the scope of the present disclosure that system 10 of FIG. 3 may additionally or alternatively be described as including at least three contacting assemblies 40. It is noted that in some embodiments, the contacting assemblies may be integrated into a single apparatus. Moreover, and similar to the well-known technologies of distillation towers or packed bed contactors, the number of theoretical equilibrium stages may be more or less than the number of physical contacting assemblies. In FIG. 3, a schematic representation of at least a fourth contacting assembly and/or contacting unit is shown in dashed lines to graphically represent that the present disclosure is not limited to only three such structures and instead may include more (or less) than three such structures. FIG. 3 also illustrates a separation assembly 76 that includes two stages, or separation units, 77, and it is within the scope of the present disclosure that the system 10 of FIG. 3 may additionally or alternatively be described as including two separation assemblies 76.

In FIG. 3, water-removal assembly 160 is shown including a pre-cooling assembly 166 that cools the process gas stream, such as to a temperature at which water is a liquid (i.e., 1-99° C.). Although not required to all systems 10 and/or methods according to the present disclosure, precooling assembly 166, when present, may cool the process gas stream to a temperature that is near, but above, the freezing point of water. Illustrative, non-exclusive examples of such a temperature, or range of temperatures, include 1° C., 2° C., 5° C., 1-10° C., 5-30° C., and 2-20° C., but other temperatures, or temperatures and ranges of temperatures may be utilized. Liquid-gas separator 164, which may additionally or alternatively be referred to as a water knock-out 164, removes condensed water from the process gas stream, as liquid water stream 168, and a gas delivery mechanism 150 in the form of a fan 152 is utilized to deliver the dehumidified process gas stream to the contacting assembly. In one or more embodiments, the process gas stream exiting water knock-out 164 includes water at a concentration equal to water saturation of the process gas stream at a temperature above the freezing point of water. As discussed herein, water-removal assembly 160 is an optional component of system 10, and it is within the scope of the present disclosure that process gas stream 20 may contain water, including at least 0.5-1 mol %, at least 1-5 mol %, or more, water.

In the illustrated example of a suitable contacting assembly 40 that is shown in FIG. 3, the contacting assembly is depicted as including at least three contacting stages 41, which as discussed, may each be referred to as a contacting assembly. As in FIG. 3., the contacting may be done in a countercurrent manner and with mechanically removal of at least a portion of generated slurry solids between at least one set of adjacent stages. The stages, or contacting assemblies, shown in FIG. 3 each includes a contacting structure 42 in which cold liquid 36 and gas-phase components 28 of process gas stream 20 are directly contacted with each other. The slurry streams 70 from the contacting assembly(ies) are passed through a solid-liquid separator 180 to form a concentrated slurry stream 71. As illustrated, the concentrated slurry streams from each of the solid-liquid separators are mixed, such as at a mixer, manifold, or similar structure 200 for receiving and combining concentrated slurry streams into a consolidated slurry stream 70'. Alternatively, the slurry streams 70 may be mixed prior to flowing to a solid-liquid concentrator.

In the illustrative example shown in FIG. 3, each stage, or contacting assembly, is fluidly interconnected in series so that the cold liquid stream from cold liquid supply 32 is delivered sequentially to each of the contacting stages and so that the gas-phase portion of process gas stream 20 is sequentially delivered to each of the contacting stages. Likewise, the resultant cold liquid streams 74 from the solid-liquid concentrators may be utilized as the cold liquid stream for the next (downstream) fluidly connected contacting stage, with the final resultant cold liquid stream 74 being recycled to the cold liquid supply as a recycle stream. As schematically illustrated, the cold liquid may be sprayed and/or otherwise dispensed as droplets into the process gas stream in the contacting assembly(ies), with illustrative, non-exclusive examples of suitable contacting structures 42 being one or more spray towers.

This sequential contacting of the cold liquid and the process gas may be in any suitable order and/or manner, with countercurrent contacting being an illustrative, non-exclusive example. It is further within the scope of the present disclosure that the liquid and/or gas flow to the contacting stages may be performed in parallel, rather than in series, and/or in both parallel and series.

In FIG. 3, the pressure of the concentrated slurry stream is increased with liquid pump 72, and a pair of separation assemblies 76 are utilized to produce two different removed streams 60, such as a stream 60' that primarily, or even completely, includes carbon dioxide, and a stream 60" that primarily, or even completely, includes water. As discussed, the removed streams 60 may be gas-phase streams, which may be referred to as removed gas streams 60, but this is not required to all systems 10 and/or methods according to the present disclosure. As illustrated, the separation assemblies 76 include a heat source 210 that is used to heat the portion of the (concentrated) slurry stream delivered thereto, such as to cause one or more of the frozen gases 24' to return to a gas phase and/or to no longer be in a solid phase. Illustrative, non-exclusive examples of suitable heat sources 210 include burners, combustion units, heaters, resistance heaters, heated fluid streams in thermal communication with the slurry, and the like.

In FIG. 3, cold liquid supply 32 includes a cooling, or refrigeration, assembly 138 that reduces the temperature of cold liquid 36 in cold liquid reservoir 132 via heat exchange with a refrigerant, such as via heat exchange in coolant loop, or coolant circuit, 140. As also shown in FIG. 3, the treated gas stream 50 containing the portion of process gas stream 20 that was not solidified in contacting assembly 40 (i.e., the non-solidifiable gas components 26) is utilized by cooling assembly 138 to cool the refrigerant, such as by heat exchange with the refrigerant.

FIG. 4 provides an illustrative, non-exclusive example of a system 10 that includes two cold liquids 36, which are delivered as separate cold liquid streams 30 from separate cold liquid supplies 32, each of which may include a cooling assembly 138. As illustrated, contacting assembly 40 is depicted as including a primary (or upstream) contacting assembly 220 and a secondary (or downstream) contacting assembly 222. Each of these contacting assemblies may include two more contacting stages, similar to the preceding discussion of FIGS. 1-3. However, in the illustrated example shown in FIG. 4, the primary contacting assembly receives and directly contacts process gas stream 20 with a cold liquid from a cold liquid supply that is different from the cold liquid and the cold liquid supply that is used to directly contact the process gas stream in the secondary contacting assembly. Accordingly, the cold liquid and the cold liquid supply (and components thereof) may be referred to as a primary, or upstream, cold liquid and cold liquid supply, and the cold liquid and the cold liquid supply (and components thereof) may be referred to as a secondary, or downstream, cold liquid and cold liquid supply. The terms "primary" and "secondary" are not intended to require, nor to preclude, that one of the contacting assemblies (or cold liquids or cold liquid supplies) is larger, more important, or otherwise preferred over the other, and instead are merely intended to descriptively differentiate the different elements.

In a system 10, such as shown in FIG. 4, that is configured to separately utilize two or more cold liquids to remove solidifiable gas components from process gas stream 20, the cold liquids will have at least one of different compositions and different contacting temperatures. An illustrative, non-exclusive situation in which cold liquids with different compositions may be utilized is when one of the solidifiable gas components of the process gas stream is soluble in, reactive with, difficult to remove from, or otherwise undesirable to be contacted with one of the cold liquids. Continuing this example, water is soluble in many alcohols that are suitable for use as a cold liquid 36 in systems 10 and/or methods according to the present disclosure, but water is not soluble in many hydrocarbons that are suitable for use as a cold liquid 36 in systems 10 and/or methods according to the present disclosure. Accordingly, the system 10 of FIG. 4 may utilize one or more hydrocarbons as the primary cold liquid, which will have a contacting temperature suitable for removing water from the process gas stream as a frozen gas 24', and may utilize one or more alcohols as a secondary cold liquid, which will have a contacting temperature suitable for removing one or more other solidifiable gas components (such as at least carbon dioxide) from the process gas stream as a frozen gas 24'.

An illustrative, non-exclusive example of a situation in which cold liquids having different contacting temperatures may be utilized is when it is desirable (economically, thermodynamically, etc.) to maintain different cold liquids (or even the same cold liquid) at different contacting temperatures, such as in different cold liquid reservoirs 132 (as opposed to having to maintain all of the cold liquid at the same temperature in a single cold liquid reservoir).

FIG. 5 provides an illustrative example of a contacting assembly 40 in which the process gas stream is bubbled through the cold liquid, as opposed to having the cold liquid sprayed or otherwise dispensed as droplets onto the process gas stream. Although illustrated as a single contacting assembly 40 having a single stage, it is within the scope of the present disclosure that a system 10 that utilizes a bubble tower or similar contacting structure, such as the structure shown in FIG. 5, may utilize two or more stages of such contacting structure. It is also within the scope of the present disclosure that a system 10 may utilize different types of contacting assemblies and/or contacting structures.

In FIG. 5, gas delivery mechanism 150 is illustrated as being a compressor 153, as opposed to a fan, as it may be desirable to deliver the process gas stream to the contacting assembly at a slightly higher pressure than a conventional fan would provide when the contacting assembly bubbles the process gas stream through the cold liquid. As an illustrative, non-exclusive example, compressor 153 may be configured to deliver the process gas stream to the contacting assembly at a pressure of at least 30-50 psia.

FIG. 5 also illustrates an example of a cooling assembly 138 that is designed to cool the contacting assembly, or stage thereof, rather than cooling the cold liquid in a separate liquid reservoir. As illustrated, the cooling assembly includes a jacket, or shell, 230 that contains refrigerant. As indicated at 232, contacting assembly 40 may include solid-removal structure, such as rotating scrapers, to remove frozen gas 24' that accumulates in the contacting assembly.

Figure 6:
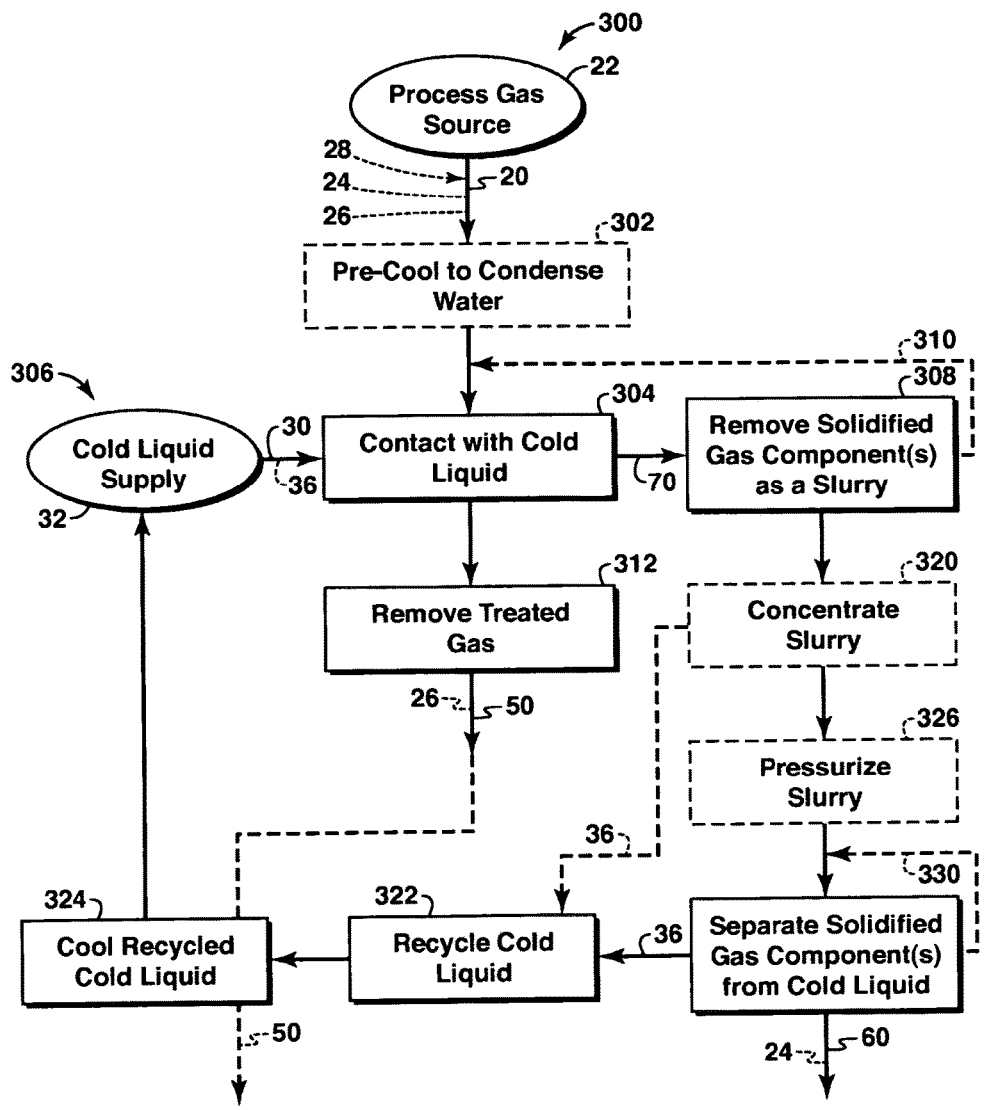
FIG. 6 is a flow diagram illustrating methods for removing solidifiable gas components from a gas stream by direct contact with a cold liquid according to the present disclosure.

Illustrative, non-exclusive examples of processes, or methods, for removing one or more solidifiable gas, or solidifiable gas component, 24 from a process gas stream 20 by direct contact with cold liquid 36 are depicted in the flow chart of FIG. 6. In FIG. 6, the process gas stream 20 is indicated and contains gas-phase components, or gases, 28, which comprise at least one solidifiable gas component 24 and at least one non-solidifiable gas component 26. As indicated at 300, process gas stream 20 may be obtained from a process gas source, or process gas supply 22, and may be or include a flue gas stream and/or other exhaust stream from a combustion process. At 302, the process gas stream is optionally pre-cooled, and this pre-cooling may include condensing and/or otherwise removing water from the process gas stream. At 304, the process gas stream is contacted directly with cold liquid 36 to solidify a solidifiable gas component that was present in the process gas stream. As discussed, this contacting may occur in a contacting assembly that is configured to directly contact the process gas stream with the cold liquid. As also discussed, the solidified gas component, which additionally or alternatively may be referred to as frozen gas and/or solids, forms a slurry with a cold liquid, as the frozen gas is mixed with the cold liquid. As further discussed, this contacting may occur at a contacting temperature and a contacting pressure, illustrative, non-exclusive examples of which have been discussed herein.

As indicated at 306, the cold liquid may be delivered as a cold liquid stream 30 from a cold liquid supply 32, such as in which the cold liquid is refrigerated or otherwise cooled to be at a suitable temperature for solidifying one or more of the solidifiable gas components of the process gas stream when directly contacted with the process gas stream.

At 308, a slurry stream 70 containing cold liquid and the frozen gas may be withdrawn from the contacting assembly or other chamber or apparatus in which the cold liquid and the process gas stream are directly contacted. As indicated at 310, the contacting and slurry removal steps may be repeated, such as in a different contacting assembly, in a different stage of the contacting assembly, etc., and this contacting may occur in a series, or sequential, manner and/or in a countercurrent manner. The remaining (non-solidified) portion of the process gas stream, which may be referred to as a treated gas stream 50 that contains the non-solidifiable gas components 26 of the process gas stream, may be removed from the contacting assembly or other chamber or apparatus in which the cold liquid and the process gas stream were directly contacted. This is indicated in FIG. 6 at 312, and the treated gas stream may thereafter be vented to the environment, used, stored, etc.

The concentration of the frozen gas in the slurry stream may be concentrated, as indicated at 320, to increase the concentration of the frozen gas in the slurry stream. This concentrating of the frozen gas may be accomplished via a variety of mechanisms, an illustrative, non-exclusive example of which is by removing some (but not all) of the cold liquid from the slurry stream. The removed cold liquid may be recycled, as indicated at 322, such as to a cold liquid supply and/or to be used again to contact the process gas stream. The recycled cold liquid may be refrigerated or otherwise cooled, as indicated at 324, such as to cool the recycled cold liquid to a suitable temperature for solidifying one or more solidifiable gas component from the process gas stream when contacted directly therewith. As discussed, this cooling optionally may utilize the treated gas stream as a heat exchange stream and may include using a refrigerant and/or refrigeration process to provide the desired cooling.

The slurry stream, which when concentrated may be referred to as a concentrated slurry stream, may be pressurized, such as with a liquid pump, as indicated at 326. The frozen gas may be removed from the slurry stream, as indicated at 328, to form at least one removed stream 60. An illustrative, non-exclusive mechanism for removing the frozen gas from the cold liquid includes heating the (concentrated) slurry stream to a temperature at which the frozen gas is no longer in the solid phase. This heating heats the (concentrated) slurry stream to a temperature at which the frozen gas returns to a gas phase, but this is not required to all systems and/or methods according to the present disclosure. As indicated at 330, the removal of the solidifiable gas component(s) from the slurry may be repeated, such as to sequentially and separately remove two or more solidifiable gas components from the slurry. The solidifiable gas component(s) that is/are removed from the (concentrated) slurry stream may be used, disposed of, vented to the environment, stored, etc. The remaining cold liquid may be recycled, as discussed herein.

Figure 7:
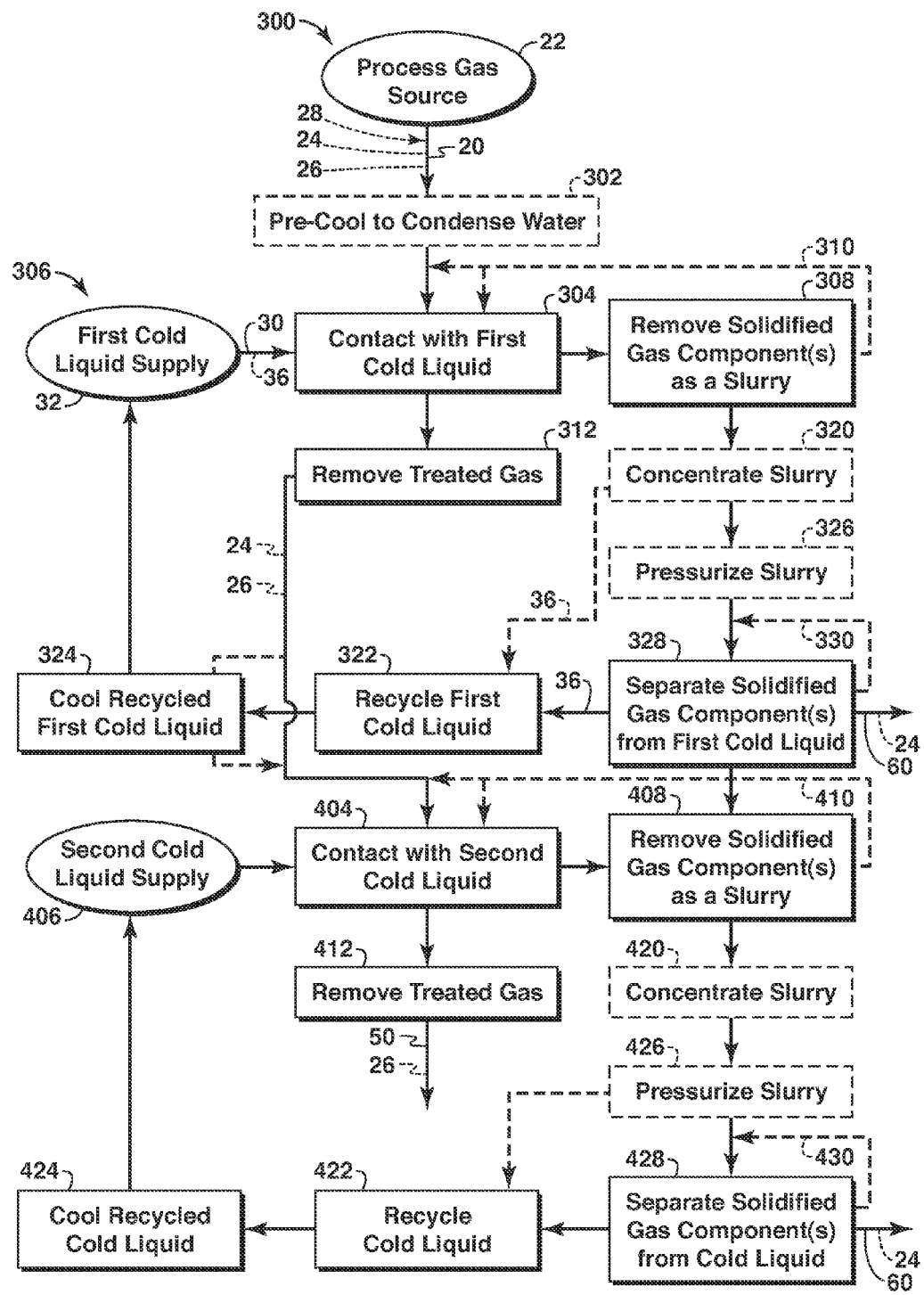
FIG. 7 is another flow diagram illustrating methods for removing solidifiable gas components from a gas stream by direct contact with a cold liquid according to the present disclosure.

Additionally illustrative, non-exclusive examples of processes, or methods, for removing one or more solidifiable gas, or solidifiable gas component, 24 from a process gas stream 20 by direct contact with cold liquid 36 are depicted in the flow chart of FIG. 7. FIG. 7 is similar to FIG. 6 except that the illustrated methods include contacting the process gas stream with a first cold liquid and with a second cold liquid, with these contacting steps being respectively indicated at 304 and 404, and with a second cold liquid supply being indicated at 406. As discussed, the first and second cold liquids may have the same or different compositions and/or the same or different temperatures. As illustrated, the treated gas stream that is produced after contacting of the process gas stream with the first cold liquid is removed, as indicated at 312, and thereafter is directly contacted with the second cold liquid, as indicated at 404. Thereafter, the method may proceed similar to the method that was previously discussed in connection with FIG. 6, with the corresponding and analogous removing, repeating (contacting), concentrating, pressurizing, separating, repeating (separating), recycling, and cooling steps indicated at 408, 410, 420, 426, 428, 430, 422, and 424, respectively. At 412, a treated gas stream 50 containing the non-solidified gas component(s) 26 from the process gas stream is removed, and the treated gas stream may thereafter be vented to the environment, used, stored, etc.

In FIGS. 6 and 7, references are made to various fluids, streams, operating conditions, and the like that were previously discussed in connection with the illustrative, non-exclusive examples of systems 10 for removing one or more solidifiable gas component from a process gas stream by direct contact with a cold liquid. It is within the scope of the present disclosure that the previously discussed illustrative, non-exclusive examples of suitable values, compositions, operating conditions, variants, and the like may be applied, even if not discussed again in connection with FIGS. 6 and 7. It is also within the scope of the present disclosure that the methods discussed and/or illustrated herein may (but are not required to) be practiced, or implemented, with the systems 10 that are discussed and/or illustrated herein. Additionally or alternatively, it is within the scope of the present disclosure that the systems 10 discussed and/or illustrated herein may (but are not required to) be utilized to perform the methods that are discussed and/or illustrated herein.

Illustrative examples of systems 10 and methods according to the present disclosure were simulated, or thermodynamically modeled, to evaluate their effectiveness for removing carbon dioxide from a process gas stream in the form of a flue gas stream from a coal-fired power plant producing 465 HP (electric) (0.35 megawatts). The modeled process (flue) gas stream had a flow rate of 1 million standard cubic feet per day (MMSCFD). After dehydration, the process gas stream had a composition of 80.7 mol % nitrogen gas, 14.5 mol % carbon dioxide, 3.8 mol % oxygen gas, 0.6 mol % water, 0.4 mol % carbon monoxide, a temperature of 2.2° C., a pressure of 16 psia, and a mass flow rate of 15,940 kg/hr. 3-methylpentane was utilized as the cold liquid, and a six-stage, countercurrent contacting assembly with recycled cold liquid was modeled. The cold liquid was maintained in a cold liquid reservoir at a temperature of −130° C. and was delivered to the first stage of the contacting assembly at a contacting temperature of −123° C. The contacting temperatures of the second-sixth stages were −104° C., −95° C., −92° C., −85° C., and −59° C., respectively. The recycled cold liquid had a composition of 99.6 mol % 3-methylpentane, 0.2 mol % carbon dioxide, 0.2 mol % nitrogen gas, and a flow rate of 21,924 kg/hr. A 50-30-15 mol % mixture of methane, ethane, and propane was utilized as the refrigerant for the cooling assembly for the cold liquid supply, and approximately 1.37 kg of coolant was recycled for every kilogram of inlet process (flue) gas that was treated. Carbon dioxide solubility in 3-methylpentane was based on data from *J. Chem. Eng. Data,* 16(4), 412-4, 1971.

The treated gas stream produced by the simulation had a composition of 94.9 mol % nitrogen gas, 0.2 mol % carbon dioxide, 4.4 mol % oxygen gas, 0.0 mol % water, and 0.5 mol % carbon monoxide, and a flow rate of 12,575 kg/hr. Accordingly, the modeled example demonstrates that a substantial majority of the carbon dioxide was removed from the process gas stream. In the modeled example, only 0.2 mol % carbon dioxide was present in the treated gas stream, which corresponds to approximately 99% removal of carbon dioxide. The modeled system 10 utilized 90 horsepower (HP) of power to operate, largely due to the cooling assembly to maintain the cold liquid in a cold liquid reservoir at −130° C., which corresponds to less than 20% of the net power production by the power plant.

In the present disclosure, several of the illustrative, non-exclusive examples of methods have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order and/or concurrently. It is within the scope of the present disclosure that the blocks, or steps, may be implemented as logic, which also may be described as implementing the blocks, or steps, as logics. In some applications, the blocks, or steps, may represent expressions and/or actions to be performed by functionally equivalent circuits or other logic devices. The illustrated blocks may, but are not required to, represent executable instructions that cause a computer, processor, and/or other logic device to respond, to perform an action, to change states, to generate an output or display, and/or to make decisions.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B", when used in conjunction with open-ended language such as "comprising" can refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" may mean A alone, B alone, C alone, A and B together, A and C together, B and C together, A, B and C together, and optionally any of the above in combination with at least one other entity.

In the event that any of the references that are incorporated by reference herein define a term in a manner or are otherwise inconsistent with either the non-incorporated portion of the present disclosure or with any of the other incorporated references, the non-incorporated portion of the present disclosure shall control, and the term or incorporated disclosure therein shall only control with respect to the reference in which the term is defined and/or the incorporated disclosure was originally present.

Illustrative, non-exclusive examples of systems and methods according to the present disclosure are presented in the following enumerated paragraphs. It is within the scope of the present disclosure that an individual step of a method recited herein, including in the following enumerated paragraphs, may additionally or alternatively be referred to as a "step for" performing the recited action.

A. A method for removing a solidifiable gas component from a process gas stream, the method comprising:

contacting a process gas stream containing a solidifiable gas component with a cold liquid at a contacting temperature and a contacting pressure to form a liquid-solid slurry containing the cold liquid and solids formed by solidifying at least a portion of the solidfiable component in the process gas stream; wherein the contacting further forms a treated gas stream containing a portion of the process gas stream that was not solidified by the contacting with the cold liquid; wherein the cold liquid is at a temperature at which the solidifiable gas component will transition to a solid phase, and optionally from a gas phase to a solid phase; and further wherein the cold liquid has a different composition than the solidifiable gas component; and removing at least a portion of the solids from the slurry.

A1. The method of paragraph A, wherein the solidifiable gas component is selected from the group consisting of carbon dioxide, hydrogen sulfide, sulfur dioxide, or carbonyl sulfide.

A2. The method of any of paragraphs A-A1, wherein the solidifiable gas component is carbon dioxide.

A3. The method of any of paragraphs A-A2, wherein the solidifiable gas component is not water.

A4. The method of any of paragraphs A-A3, wherein the process gas stream contains a plurality of solidifiable gas components.

A5. The method of paragraph A4, wherein the solids include solidified phases of at least two of the plurality of solidifiable gas components.

A6. The method of paragraph A4 or A5, wherein the plurality of solidifiable gas components is selected from the group consisting of carbon dioxide, hydrogen sulfide, sulfur dioxide, water, and carbonyl sulfide.

A7. The method of any of paragraphs A4-A6, wherein the plurality of solidifiable gas components includes carbon dioxide.

A8. The method of any of paragraphs A6-A7, wherein the plurality of solidifiable gas components does not include water.

A9. The method of any of paragraphs A-A8, wherein the process gas stream includes water.

A10. The method of paragraph A9, wherein the method includes removing water from the process gas stream prior to the contacting.

A11. The method of paragraph A10, wherein the removing water includes cooling the process gas stream to a temperature at which the water condenses to a liquid and separating the liquid water from the process gas stream.

A12. The method of paragraph A10, wherein the removing water includes cooling the process gas stream to a temperature at which the water freezes and separating the frozen water from the process gas stream.

A13. The method of any of paragraphs A-A8, wherein the process gas stream does not include water.

A14. The method of any of paragraphs A-A13, wherein the process gas stream has a pressure of less than 200 psia, optionally wherein the process gas stream has a pressure of less than 100 psia, optionally wherein the process gas stream has a pressure of less than 50 psia, optionally wherein the process gas stream has a pressure of less than 30 psia, and further optionally wherein the process gas stream has a pressure of less than 20 psia.

A15. The method of any of paragraphs A-A14, wherein the process gas stream further includes at least one gas component that remains in a gas phase at the contacting temperature and the contacting pressure.

A16. The method of paragraph A15, wherein the process gas stream comprises nitrogen gas, and optionally wherein the process gas stream comprises nitrogen gas as a majority component.

A17. The method of any of paragraphs A-A16, wherein the process gas stream includes an exhaust stream from a combustion process.

A18. The method of any of paragraphs A-A17, wherein the process gas stream includes a flue gas stream, and optionally is a flue gas stream.

A19. The method of any of paragraphs A-A18, wherein the cold liquid has a temperature that is below the temperature at which solid carbon dioxide will precipitate from the process gas stream.

A20. The method of any of paragraphs A-A19, wherein the cold liquid has a freezing point that is less than −100° C., optionally wherein the cold liquid has a freezing point that is less than −120° C., and further optionally wherein the cold liquid has a freezing point that is less than −140° C.

A21. The method of any of paragraphs A-A20, wherein the cold liquid has a solidifiable gas component solubility of less than 10 mol % at the contacting pressure and the contacting temperature, and optionally a solidifiable gas component solubility of less than 5 mol % at the contacting pressure and the contacting temperature, and further optionally a solidifiable gas component solubility of less than 2 mol % at the contacting pressure and the contacting temperature.

A22. The method of any of paragraphs A-A21, wherein the cold liquid has a carbon dioxide solubility of less than 10 mol % at the contacting pressure and the contacting temperature, optionally wherein the cold liquid has a carbon dioxide solubility of less than 5 mol % at the contacting pressure and the contacting temperature, and further optionally wherein the cold liquid has a carbon dioxide solubility of less than 2 mol % at the contacting pressure and the contacting temperature.

A23. The method of any of paragraphs A-A22, wherein the cold liquid comprises at least one isoalkane, isoalkene, or alcohol.

A24. The method of paragraph A23, wherein the cold liquid comprises at least one isoalkane, isoalkene, or alcohol that forms a majority component of the cold liquid.

A25. The method of any of paragraphs A-A24, wherein the cold liquid has a different composition than the process gas stream.

A26. The method of any of paragraphs A-A25, wherein the cold liquid does not include the at least one solidifiable component.

A27. The method of any of paragraphs A-A26, wherein the cold liquid does not include carbon dioxide.

A28. The method of any of paragraphs A-A27, wherein the cold liquid is a liquid at a temperature of 20° C. and a pressure of 1 atmosphere.

A29. The method of any of paragraphs A-A28, wherein the cold liquid comprises a mixture of two or more components.

A30. The method of any of paragraphs A-A29, wherein the cold liquid comprises an isohexane or hexane.

A31. The method of any of paragraphs A-A30, wherein the cold liquid comprises a mixture of ethanol and methanol.

A32. The method of any of paragraphs A-A31, wherein the contacting pressure is less than 100 psia, and optionally wherein the contacting pressure is less than 50 psia.

A33. The method of any of paragraphs A-A32, wherein the contacting temperature is less than −80° C., optionally wherein the contacting temperature is less than −100° C., and further optionally wherein the contacting temperature is less than −120° C.

A34. The method of any of paragraphs A-A33, wherein the contacting includes cooling the process gas stream to a temperature sufficient to precipitate carbon dioxide in the process gas stream as a solid.

A35. The method of any of paragraphs A-A34, wherein the contacting includes cooling the process gas stream to a temperature sufficient to freeze hydrogen sulfide.

A36. The method of any of paragraphs A-A35, wherein the contacting comprises spraying the process gas stream with the cold liquid.

A37. The method of paragraph A36, wherein the contacting includes spraying the process gas stream with droplets of the cold liquid.

A38. The method of paragraph A36 or A37, wherein the contacting includes spraying the process gas stream with the cold liquid in a spray tower.

A39. The method of any of paragraphs A-A38, wherein the contacting includes countercurrent contacting between the process gas stream and the cold liquid.

A40. The method of any of paragraphs A-A35, wherein the contacting includes bubbling the process gas stream through the cold liquid.

A41. The method of any of paragraphs A-A40, wherein the method includes repeating the contacting with the cold liquid at a different contacting temperature.

A42. The method of any of paragraphs A-A41, wherein the cold liquid is a first cold liquid, and further wherein the method includes repeating the contacting with a second cold liquid having a different composition than the first cold liquid.

A43. The method of any of paragraphs A-A42, wherein the method includes repeating the contacting with a second cold liquid at a different contacting temperature.

A44. The method of any of paragraphs A-A43, wherein the removing includes heating the slurry to a temperature at which the solids are no longer in a solid phase.

A45. The method of paragraph A44, wherein the removing includes heating the slurry to a temperature at which the solids are in a liquid phase.

A46. The method of paragraph A44, wherein the removing includes heating the slurry to a temperature at which the solids are in a gas phase.

A47. The method of any of paragraphs A44-A46, wherein the solids that are no longer in a solid phase are transformed solids, and further wherein the method includes separating the transformed solids from the slurry to form an outlet stream.

A48. The method of paragraph A47, wherein the method includes pumping the outlet stream into a subsurface formation for disposal.

A49. The method of any of paragraphs A-48, wherein prior to the removing, the method includes pressurizing the slurry.

A50. The method of paragraph A49, wherein the pressurizing includes increasing the pressure of the slurry to a pressure that is greater than the contacting pressure.

A51. The method of any of paragraphs A49 or A50, wherein the pressurizing includes increasing the pressure of the slurry using a liquid pump.

A52. The method of any of paragraphs A59-A51, wherein the pressurizing does not include using a gas compressor to increase the pressure of the slurry.

A53. The method of any of paragraphs A49-A51, wherein the pressurizing includes heating the solids in a sealed container.

A54. The method of any of paragraphs A-A53, wherein prior to the removing, the method includes increasing the concentration of the solids in the slurry.

A55. The method of paragraph A54, wherein the removing includes utilizing at least one of a filter, a centrifugal separator, a static centrifugal separator, and/or a settling tank to increase the concentration of solids in the slurry by removing some of the cold liquid from the slurry.

A56. The method of any of paragraphs A-A55, wherein prior to the removing, the method includes withdrawing a portion of the cold liquid from the slurry to form a recycle stream of the cold liquid, and further wherein the method includes cooling the recycle stream to a temperature that is at or below the contacting temperature.

A57. The method of paragraph A56, wherein the method includes delivering the recycle stream to a liquid reservoir containing the cold liquid.

A58. The method of any of paragraphs A4-A57, wherein when the slurry includes solids formed from at least two of the plurality of solidifiable gas components, the method further includes separately removing the plurality of gas components from the slurry to form separate removed streams respectively containing one of the plurality of solidifiable gas components.

A59. The method of paragraph A58, wherein the method includes heating the slurry in two or more stages to separately melt portions of the solids containing the at least two solidifiable gas components.

A60. The method of any of paragraphs A-A59, wherein the method includes delivering the cold liquid to the contacting assembly from a cold liquid supply.

A61. The method of any of paragraphs A-A60, wherein the method includes recycling the cold liquid in the slurry to the cold liquid supply.

A62. The method of any of paragraphs A-A61, wherein the method includes injecting the solids, optionally after heating the solids to form a gas, into a subsurface region.

A63. The method of any of paragraphs A-A62, wherein the method includes using the solids, after heating the solids to form a gas, to recover hydrocarbons from a subsurface region.

A64. The method of any of paragraphs A-A63, wherein the solids are frozen gas formed by sufficiently cooling the solidifiable gas component from a gas phase to a solid phase.

A65. The method of any of paragraphs A-A64, wherein the solids are formed from the solidifiable gas component, or components, without chemically reacting the solidifiable gas component or forming one or more other compounds from the solidifiable gas component, or components.

A66. The method of any of paragraphs A-A65, wherein the removing produces a resultant liquid stream from which the solids were removed, and further wherein the method includes recycling the resultant liquid to form at least a portion of the cold liquid.

A67. The method of paragraph A66, wherein the method includes cooling the resultant liquid stream by heat exchange with at least a portion of the treated gas stream.

A68. The method of any of paragraphs A-A67, wherein the contacting step is performed in a countercurrent manner.

A69. The method of any of paragraphs A-A68, wherein the contacting step is performed in two or more stages.

A70. The method of any of paragraphs A-A69, wherein the removing step is performed mechanically and removal occurs between at least one set of adjacent stages.

A71. The method of any of paragraphs A-A70, wherein the mechanical removal of at least a portion of the solids from the slurry forms a concentrated flowable slurry.

A72. The use of the methods of any of paragraphs A-A71 to remove a solidifiable gas component from a process gas stream, by direct contact with a cold liquid, to form a treated gas stream that contains a reduced concentration of the solidifiable gas component.

A73. The use of the methods of any of paragraphs A-A71 to remove a solidifiable gas component from a process gas stream, by direct contact with a cold liquid, to form a treated gas stream that does not contain the solidifiable gas component.

A74. A system for removing a solidifiable gas component from a process gas stream, the system comprising means for performing the methods of any of paragraphs A-A71.

A75. Gas removed from a process gas stream by the methods of any of paragraphs A-A71.

A76. A treated gas stream produced by the methods of any of paragraphs A-A71

B. A system for removing a solidifiable gas component from a process gas stream, the system comprising:

a cold liquid supply containing cold liquid having a cold liquid temperature;

a process gas source containing process gas containing gases that include a solidifiable gas component having a freezing point and at least one other gas component having a freezing point that is lower than the freezing point of the solidifiable gas component;

a contacting assembly adapted to receive a cold liquid stream containing cold liquid from the cold liquid supply, a process gas stream containing process gas from the process gas source, and to directly contact the cold liquid with the process gas at a contacting temperature and a contacting pressure to produce a liquid-solid slurry and a treated gas stream, wherein the slurry contains the cold liquid and solids formed from the solidifiable gas component, and further wherein the treated gas stream contains the at least one other gas component; and a separation assembly adapted to remove the solids from the slurry to produce a removed stream containing the solidifiable gas component that was removed from the process gas stream.

B1. The system of paragraph B, wherein the contacting assembly is configured to bubble the process gas stream through the cold liquid.

B2. The system of any of paragraphs B-B1, wherein the contacting assembly is configured to spray the cold liquid onto the process gas.

B3. The system of any of paragraphs B-B2, wherein the contacting assembly includes at least one spray tower, bubble column, bubble contactor, or tank.

B4. The system of paragraph B2, wherein the contacting assembly includes at least one spray tower.

B5. The system of any of paragraphs B-B4, wherein the contacting assembly includes a plurality of contacting stages in which the process gas stream is directly contacted with the cold liquid.

B6. The system of paragraph B5, wherein the plurality of contacting stages are configured for countercurrent contacting of the cold liquid and the process gas stream.

B7. The system of paragraph B5 or B6, wherein the plurality of contacting stages are configured for series contacting of the cold liquid with the process gas stream.

B8. The system of any of paragraphs B-B7, wherein the contacting assembly includes a plurality of contacting assemblies.

B9. The system of paragraph B8, wherein the cold liquid supply is a first cold liquid supply, the cold liquid stream is a first cold liquid stream, the cold liquid is a first cold liquid, and further wherein the system includes a second cold liquid supply that is adapted to deliver a second cold liquid stream containing a second cold liquid into direct contact with the process gas stream.

B10. The system of paragraph B9, wherein the first cold liquid and the second cold liquid have different compositions.

B11. The system of paragraph B9 or B10, wherein the first cold liquid and the second cold liquid have different temperatures.

B12. The system of any of paragraphs B9-B11, wherein the plurality of contacting assemblies include a first contacting assembly in which the process gas stream is contacted directly with the first cold liquid, and further wherein the plurality of contacting assemblies include a second contacting assembly in which at least a portion of the process gas stream is contacted directly with the second cold liquid.

B13. The system of any of paragraphs B-B12, wherein the separation assembly includes a heat source adapted to heat the slurry to a temperature at which the solids are no longer in the solid phase.

B14. The system of any of paragraphs B-B13, wherein the separation assembly includes a heat source adapted to heat the slurry to a temperature that is above the freezing point of the solidifiable gas component.

B15. The system of paragraph B14, wherein the heat source includes a resistive heater.

B16. The system of paragraph B14, wherein the heat source includes a burner.

B17. The system of paragraph B14, wherein the heat source includes a heated fluid stream in thermal communication with the slurry.

B18. The system of any of paragraphs B-B17, wherein the process gas includes a plurality of solidifiable gas components, the solids are formed from the plurality of solidifiable gas components, and further wherein the system includes a plurality of separation assemblies.

B19. The system of paragraph B18, wherein each separation assembly is adapted to remove a respective one of the solidifiable gas components from the slurry.

B20. The system of paragraph B18 or B19, wherein each separation assembly is adapted to heat the slurry to remove a solidifiable gas component from the slurry.

B21. The system of any of paragraphs B18-B20, wherein the separation assemblies are adapted to heat the slurry to different temperatures.

B22. The system of any of paragraphs B-B21, wherein the system further includes a water removal assembly adapted to remove water from the process gas stream.

B23. The system of paragraph B22, wherein the water removal assembly is adapted to cool the process gas stream.

B24. The system of any of paragraphs B-B23, wherein the system includes a liquid pump that receives a slurry stream containing the slurry from the contacting assembly and increases the pressure of the slurry.

B25. The system of paragraph B24, wherein the liquid pump is configured to increase the pressure of the slurry to a pressure that is greater than the contacting pressure.

B26. The system of any of paragraphs B-B25, wherein the system includes a solid-liquid separator that is adapted to receive a slurry stream containing the slurry from the contacting assembly and to separate the slurry stream into a concentrated slurry stream and a resultant cold liquid stream, wherein the concentrated slurry stream contains a greater concentration of the solids than the slurry stream, and further wherein the resultant cold liquid stream does not include all of the cold liquid present in the slurry stream.

B27. The system of paragraph B26, wherein the solid liquid separator is selected from the group consisting of at least one of a filter, a centrifugal separator, a static centrifugal separator, a mechanical moving scraper, and/or a settling tank.

B28. The system of any of paragraphs B26-B27, wherein the solid liquid separator is utilized in a batch, semi-batch, or continuous mode of operation to separate the slurry stream into the concentrated slurry stream and the resultant cold liquid stream.

B29. The system of any of paragraphs B-B28, wherein the solidifiable gas component is selected from the group consisting of carbon dioxide, hydrogen sulfide, sulfur dioxide, or carbonyl sulfide.

B30. The system of any of paragraphs B-B29, wherein the solidifiable gas component is carbon dioxide.

B31. The system of any of paragraphs B-B30, wherein the solidifiable gas component is not water.

B32. The system of any of paragraphs B-B31, wherein the process gas stream contains a plurality of solidifiable gas components.

B33. The system of paragraph B32, wherein the solids include solidified phases of at least two of the plurality of solidifiable gas components.

B34. The system of paragraph B32 or B33, wherein the plurality of solidifiable gas components is selected from the group consisting of carbon dioxide, hydrogen sulfide, sulfur dioxide, water, and carbonyl sulfide.

B35. The system of any of paragraphs B32-B34, wherein the plurality of solidifiable gas components includes carbon dioxide.

B36. The system of any of paragraphs B34-B35, wherein the plurality of solidifiable gas components does not include water.

B37. The system of any of paragraphs B-B36, wherein the process gas stream includes water.

B38. The system of any of paragraphs B-B36, wherein the process gas stream does not include water.

B39. The system of any of paragraphs B-B38, wherein the process gas stream has a pressure of less than 200 psia, optionally wherein the process gas stream has a pressure of less than 100 psia, optionally wherein the process gas stream has a pressure of less than 50 psia, optionally wherein the process gas stream has a pressure of less than 30 psia, and further optionally wherein the process gas stream has a pressure of less than 20 psia.

B40. The system of any of paragraphs B-B39, wherein the process gas stream further includes at least one gas component that remains in a gas phase at the contacting temperature and the contacting pressure.

B41. The system of paragraph B40, wherein the process gas stream comprises nitrogen gas, and optionally wherein the process gas stream comprises nitrogen gas as a majority component.

B42. The system of any of paragraphs B-B41, wherein the process gas stream includes an exhaust stream from a combustion process.

B43. The system of any of paragraphs B-B42, wherein the process gas stream includes a flue gas stream, and optionally is a flue gas stream.

B44. The system of any of paragraphs B-B43, wherein the cold liquid has a temperature that is below the temperature at which solid carbon dioxide will precipitate from the process gas stream.

B45. The system of any of paragraphs B-B44, wherein the cold liquid has a freezing point that is less than −100° C., optionally wherein the cold liquid has a freezing point that is less than −120° C., and further optionally wherein the cold liquid has a freezing point that is less than −140° C.

B46. The system of any of paragraphs B-B45, wherein the cold liquid has a solidifiable gas component solubility of less than 10 mol % at the contacting pressure and the contacting temperature, and optionally a solidifiable gas component solubility of less than 5 mol % at the contacting pressure and the contacting temperature, and further optionally a solidifiable gas component solubility of less than 2 mol % at the contacting pressure and the contacting temperature.

B47. The system of any of paragraphs B-B46, wherein the cold liquid has a carbon dioxide solubility of less than 10 mol % at the contacting pressure and the contacting temperature, optionally wherein the cold liquid has a carbon dioxide solubility of less than 5 mol % at the contacting pressure and the contacting temperature, and further optionally wherein the cold liquid has a carbon dioxide solubility of less than 2 mol % at the contacting pressure and the contacting temperature.

B48. The system of any of paragraphs B-B47, wherein the cold liquid includes isoalkane, isoalkene, alcohol, or combinations thereof.

B49. The system of paragraph B48, wherein the cold liquid comprises at least one isoalkane, isoalkene, or alcohol that forms a majority component of the cold liquid.

B50. The system of any of paragraphs B-B49, wherein the cold liquid has a different composition than the process gas stream.

B51. The system of any of paragraphs B-B50, wherein the cold liquid does not include the at least one solidifiable component.

B52. The system of any of paragraphs B-B51, wherein the cold liquid does not include carbon dioxide.

B53. The system of any of paragraphs B-B52, wherein the cold liquid is a liquid at a temperature of 20° C. and a pressure of 1 atmosphere.

B54. The system of any of paragraphs B-B53, wherein the contacting pressure is less than 100 psia, optionally wherein the contacting pressure is less than 50 psia, and further optionally wherein the contacting pressure is less than 35 psia.

B55. The system of any of paragraphs B-B54, wherein the contacting temperature is less than −80° C., optionally wherein the contacting temperature is less than −100° C., and further optionally wherein the contacting temperature is less than −120° C.

B56. The system of any of paragraphs B-B55 configured to utilize the methods of any of paragraphs A-A70.

B57. The system of any of paragraphs B-B55, wherein the process gas stream includes water at a concentration equal to a water saturation at a temperature above the freezing point of water.

B58. The system of any of paragraphs B-B57, wherein the contact assembly is adapted to contact the cold liquid and the process gas in a countercurrent manner.

B59. The system of any of paragraphs B-B58, wherein the contact assembly includes two or more stages.

B60. The system of any of paragraphs B-B59, wherein the separation assembly is adapted to mechanically remove solids from the liquid-solid slurry and removal occurs between at least one set of adjacent stages.

B61. Gas removed from a process gas stream by the systems of any of paragraphs B-B50.

B62. A treated gas stream produced by the systems of any of paragraphs B-B60.

C. A system for removing a solidifiable gas component from a process gas stream, the system comprising:

means for providing a cold liquid and a process gas stream; wherein the process gas stream includes a solidifiable gas component having a freezing point and at least one other gas component having a freezing point that is lower than the freezing point of the solidifiable gas component; and further wherein the cold liquid has a freezing point that is lower than a temperature at which the solidifable gas component within the process gas stream will transition to a solid phase, is liquid at a temperature of 20° C. and a pressure of 1 atm, and has a different composition than the process gas stream;

means for directly contacting the cold liquid with the process gas stream to solidify the solidifiable gas component and to form a liquid-solid slurry and a treated gas stream;

wherein the slurry contains the cold liquid and the solidified solidifiable gas component; and further wherein the treated gas stream contains a portion of the process gas stream that was not solidified to form the slurry; and means for removing the solidified solidifiable gas component from the slurry.

C1. The system of paragraph C, wherein the solidifiable gas component is carbon dioxide, and the other gas component is nitrogen gas.

C2. The system of paragraph C or C1, wherein the means for directly contacting includes at least one spray tower, bubble column, bubble contactor, or tank.

C3. The system of any of paragraphs C-C2, wherein the cold liquid includes at least one isoalkane, isoalkene, or alcohol.

C4. The system of any of paragraphs C-C3, wherein the means for directly contacting contacts the cold liquid with the process gas stream in a countercurrent manner.

C5. The system of any of paragraphs C-C4, wherein the means for directly contacting contacts the cold liquid with the process gas stream in two or more stages.

C6. The system of any of paragraphs C-05, wherein the means for removing mechanically removes the solidified solidifiable gas component between at least one set of adjacent stages.

INDUSTRIAL APPLICABILITY

The systems and methods disclosed herein are applicable to at least the oil and gas and gas processing industries.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

We claim:

1. A method for removing a solidifiable gas component from a process gas stream, the method comprising:
(a) contacting in a countercurrent manner in two or more equilibrium stages in a contacting assembly a process gas stream containing a solidifiable gas component with a cold liquid to form a liquid-solid slurry containing the cold liquid and solids formed by solidifying at least a portion of the solidifiable gas component in the process gas stream, wherein the contacting in each stage occurs at a contacting temperature for that stage and a contacting pressure for that stage;
wherein:
the cold liquid is a liquid at the contacting temperature and contacting pressure for each stage and wherein the cold liquid is a liquid at a temperature of 20° C. and a pressure of 1 atmosphere;
the contacting further forms a treated gas stream containing a portion of the process gas stream that was not solidified by the contacting with the cold liquid;
the cold liquid is at a temperature at which the solidifiable gas component within the process gas stream will transition to a solid phase;
the cold liquid has a different composition than the solidifiable gas component; and
the process gas stream includes at least one gas component that remains in a gas phase at the contacting temperature and the contacting pressure; and
wherein the contacting in at least one of the two or more equilibrium stages occurs at a contacting temperature of less than −100° C. and a contacting pressure of less than 100 psia; and
wherein the contacting in at least one other of the two or more equilibrium stages occurs at a contacting temperature of less than −80° C. and a contacting pressure of less than 100 psia; and
(b) removing at least a portion of the solids from the slurry,
wherein the removing step is performed mechanically and removal occurs between at least one set of adjacent equilibrium stages.

2. The method of claim 1, wherein the solidifiable gas component is selected from the group consisting of carbon dioxide, hydrogen sulfide, sulfur dioxide, or carbonyl sulfide.

3. The method of claim 1, wherein the solidifiable gas component is carbon dioxide.

4. The method of claim 1, wherein the process gas stream contains a plurality of solidifiable gas components.

5. The method of claim 1, wherein the process gas stream includes water at a concentration equal to a water saturation at a temperature above the freezing point of water.

6. The method of claim 5, wherein the method includes removing at least a portion of the water from the process gas stream prior to the contacting.

7. The method of claim 1, wherein the process gas stream includes an exhaust stream from a combustion process.

8. The method of claim 1, wherein the cold liquid has a temperature that is below the temperature at which solid carbon dioxide will precipitate from the process gas stream.

9. The method claim 1, wherein the cold liquid has a solidifiable gas component solubility of less than 10 mol % at the contacting pressure and the contacting temperature.

10. The method of claim 1, wherein the cold liquid has a different composition than the process gas stream.

11. The method of claim 1, wherein the cold liquid has a freezing point of less than −100° C.

12. The method of claim 1, wherein the cold liquid comprises at least one isoalkane, isoalkene, or alcohol that forms a majority component of the cold liquid.

13. The method of claim 1, wherein the cold liquid comprises a mixture of two or more components.

14. The method of claim 12, wherein the cold liquid comprises an isohexane, an isohexene, or combination thereof.

15. The method of claim 1, wherein the cold liquid comprises an ethanol, a methanol, or combinations thereof.

16. The method of claim 1, wherein the contacting pressure in at least one equilibrium stage is less than 50 psia.

17. The method of claim 1, wherein the contacting comprises spraying the process gas stream with the cold liquid.

18. The method claim 1, wherein the contacting includes bubbling the process gas stream through the cold liquid.

19. The method of claim 1, wherein the method includes repeating the contacting with the cold liquid at a different contacting temperature.

20. The method of claim 1, wherein the cold liquid is a first cold liquid, and further wherein the method includes repeating the contacting with a second cold liquid having a different composition than the first cold liquid.

21. The method of claim 1, wherein the method includes repeating the contacting with a second cold liquid at a different contacting temperature.

22. The method of claim 1, wherein the removing includes heating the slurry to a temperature at which at least a portion of the solids are no longer in a solid phase.

23. The method of claim 1, wherein prior to the removing, the method includes pressurizing the slurry to a pressure that is greater than the contacting pressure.

24. The method of claim 23, wherein the pressurization is achieved by heating the solid in a sealed container.

25. The method of claim 1, wherein prior to the removing, the method includes increasing the concentration of the solids in the slurry by removing a portion of the cold liquid from the slurry.

26. The method of claim 22, wherein the solids that are no longer in a solid phase are transformed solids, and further wherein the method includes separating at least a portion of the transformed solids to form an outlet stream.

27. The method of claim 26, wherein the outlet stream is pumped into a subsurface formation for disposal.

28. The method of claim 1, wherein the removing produces a resultant liquid stream from which the solids were removed, and further wherein the methods includes recycling the resultant liquid to form at least a portion of the cold liquid.

29. The method of claim 28, wherein the method includes cooling the resultant liquid stream by heat exchange with at least a portion of the treated gas stream.

30. The method of claim 1, wherein the removing step is performed using a filter.

31. The method of claim 1, wherein the treated gas stream is utilized by a cooling assembly to cool a refrigerant used to cool a liquid stream to form the cold liquid.

32. The method of claim 1, the removing step is performed using a centrifugal separator or a static centrifugal separator.

* * * * *